US012132536B2

(12) United States Patent
Khoshnevisan et al.

(10) Patent No.: US 12,132,536 B2
(45) Date of Patent: Oct. 29, 2024

(54) CODEWORD LAYER MAPPING FOR RATE-SPLITTING MIMO COMMUNICATION

(71) Applicant: QUALCOMM Incorporated, San Diego, CA (US)

(72) Inventors: Mostafa Khoshnevisan, San Diego, CA (US); Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/808,512

(22) Filed: Jun. 23, 2022

(65) Prior Publication Data

US 2023/0421213 A1 Dec. 28, 2023

(51) Int. Cl.
*H04L 5/00* (2006.01)
*H04B 7/0417* (2017.01)
*H04B 7/0452* (2017.01)
*H04B 7/0456* (2017.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ......... *H04B 7/0452* (2013.01); *H04B 7/0417* (2013.01); *H04B 7/0456* (2013.01); *H04B 7/0473* (2013.01); *H04L 5/0023* (2013.01); *H04L 5/0048* (2013.01); *H04L 5/0053* (2013.01); *H04L 5/0092* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .... H04B 7/02–12; H04J 11/0023–0093; H04J 2011/0003–0096; H04J 13/0003–22; H04J 2013/0037–165; H04L 1/0001–248; H04L 5/0001–26; H04W 72/02–569; H04W 84/02–16; H04W 88/02–12; H04W 92/02–04; H04W 92/10
See application file for complete search history.

(56) References Cited

U.S. PATENT DOCUMENTS

2021/0126739 A1* 4/2021 Hao .................... H04B 7/0413

* cited by examiner

*Primary Examiner* — Timothy J Weidner
(74) *Attorney, Agent, or Firm* — Procopio, Cory, Hargreaves & Savitch LLP

(57) ABSTRACT

A UE may receive a first indication of a mapping of a plurality of layers to a c-CW and a p-CW from a network entity, indicating that the c-CW corresponds to at least one first layer of the plurality of layers and the p-CW corresponds to at least one second layer of the plurality of layers. The plurality of layers, the c-CW, and the p-CW may be associated with rate-splitting for MIMO communication. The UE may identify a first set of modulated symbols and a second set of modulated symbols that are mapped to the at least one first layer and the at least one second layer, respectively, based on the first indication. The UE may perform a decoding process for at least one of the c-CW or the p-CW based on at least one of the first set of modulated symbols or the second set of modulated symbols.

30 Claims, 16 Drawing Sheets

CODEWORD LAYER MAPPING FOR RATE-SPLITTING MIMO COMMUNICATION

TECHNICAL FIELD

The present disclosure relates generally to communication systems, and more particularly, to a rate-splitting multiple input-multiple output (MIMO) communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory at a user equipment (UE) and at least one processor coupled to the memory. Based at least in part on information stored in the memory, the at least one processor may be configured to receive a first indication of a mapping of a plurality of layers to a first common codeword (c-CW) and a first private codeword (p-CW) from a network entity. The first indication may indicate that the first c-CW corresponds to at least one first layer of the plurality of layers and that the first p-CW corresponds to at least one second layer of the plurality of layers. The plurality of layers may be associated with multiple input-multiple output (MIMO) communication. The first c-CW and the first p-CW may be associated with rate-splitting for the MIMO communication. Based at least in part on information stored in the memory, the at least one processor may be configured to identify a first set of modulated symbols of the first c-CW that is mapped to the at least one first layer and a second set of modulated symbols of the first p-CW that is mapped to the at least one second layer based on the first indication. Based at least in part on information stored in the memory, the at least one processor may be configured to perform a decoding process for at least one of the first c-CW or the first p-CW based on at least one of the first set of modulated symbols or the second set of modulated symbols.

In an aspect of the disclosure, a method, a computer-readable medium, and an apparatus are provided. The apparatus may include a memory at a network entity and at least one processor coupled to the memory. Based at least in part on information stored in the memory, the at least one processor may be configured to map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. Based at least in part on information stored in the memory, the at least one processor may be configured to transmit a first indication of the mapping of the plurality of layers to the first c-CW and the first p-CW for a first UE. The first indication may indicate that the first c-CW corresponds to the at least one first layer and the first p-CW corresponds to the at least one second layer.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
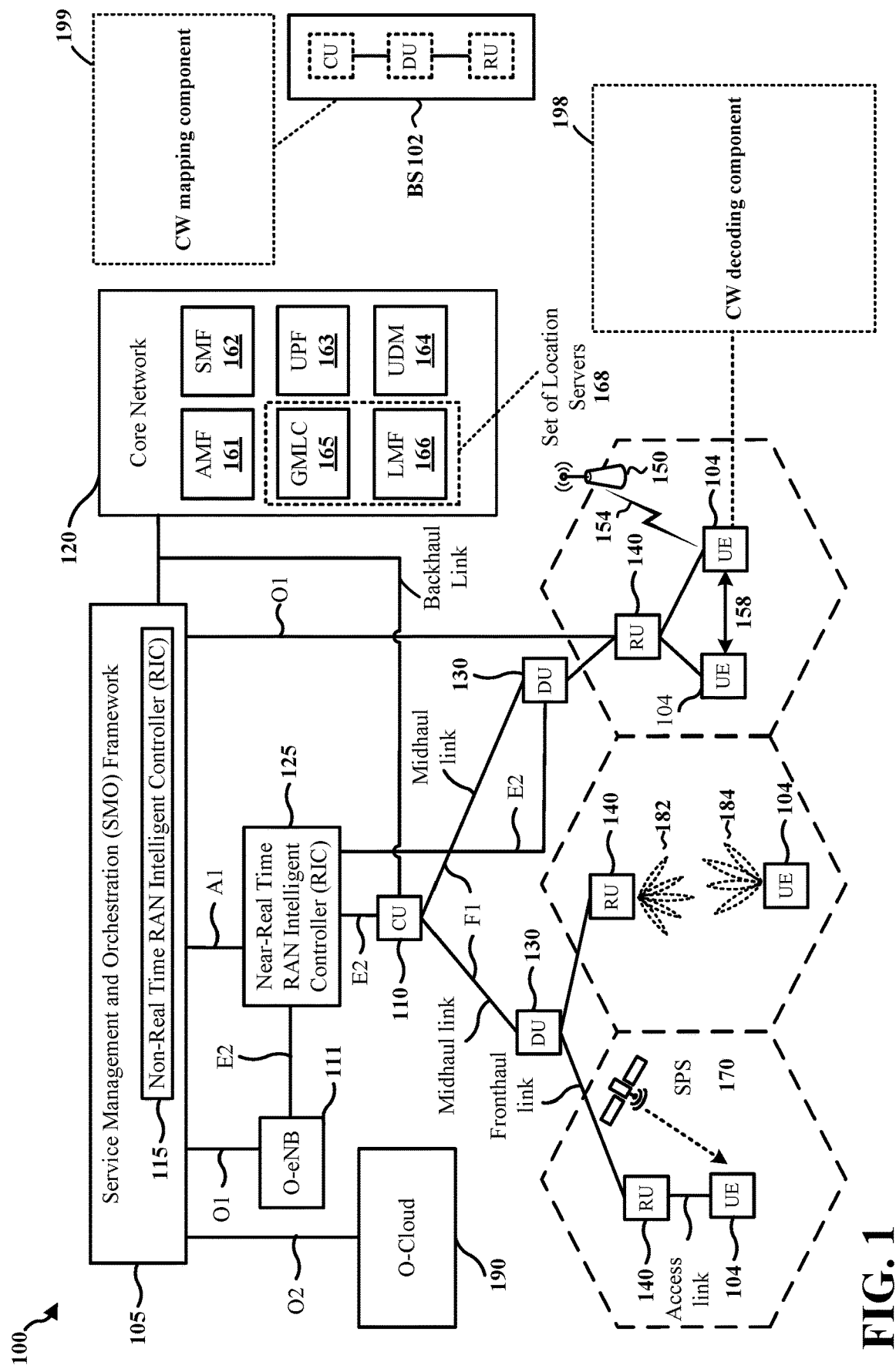
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality may be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a CW decoding component 198 configured to receive a first indication of a mapping of a plurality of layers to a first c-CW and a first p-CW from a network entity. The first indication may indicate that the first c-CW corresponds to at least one first layer of the plurality of layers and that the first p-CW corresponds to at least one second layer of the plurality of layers. The plurality of layers may be associated with MIMO communication. The first c-CW and the first p-CW may be associated with rate-splitting for the MIMO communication. The CW decoding component 198 may be configured to identify a first set of modulated symbols of the first c-CW that is mapped to the at least one first layer and a second set of modulated symbols of the first p-CW that is mapped to the at least one second layer based on the first indication. The CW decoding component 198 may be configured to perform a decoding process for at least one of the first c-CW or the first p-CW based on at least one of the first set of modulated symbols or the second set of modulated symbols.

In certain aspects, the base station 102 may have a CW mapping component 199 configured to map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. The CW mapping component 199 may be configured to transmit a first indication of the mapping of the plurality of layers to the first c-CW and the first p-CW for a first UE. The first indication may indicate that the first c-CW corresponds to the at least one first layer and the first p-CW corresponds to the at least one second layer. Although the following description may be focused on 5G NR, the concepts described herein may be applicable to other similar areas, such as LTE, LTE-A, CDMA, GSM, and other wireless technologies."

Figures 2A, 2B, 2C, 2D:
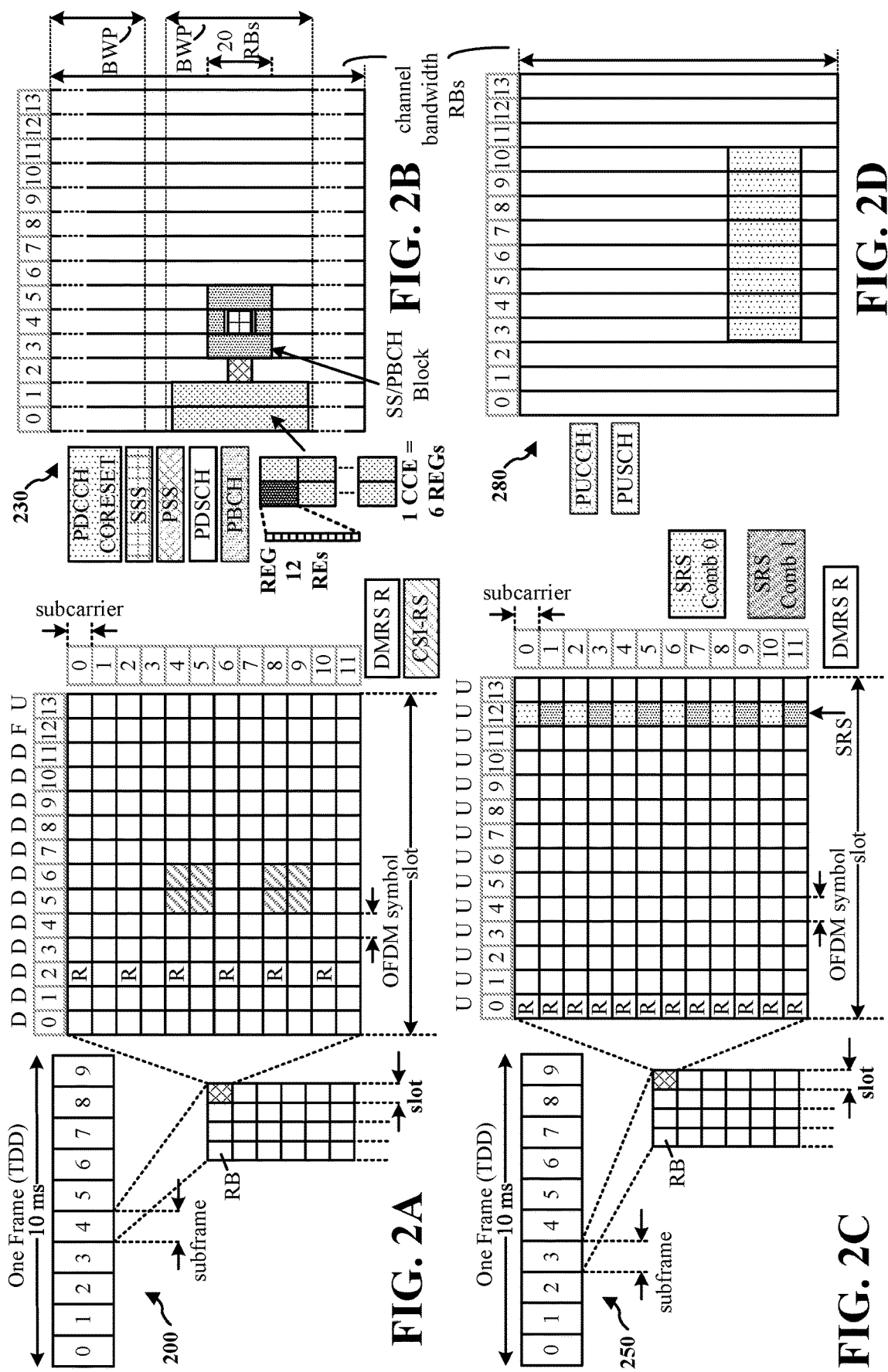
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
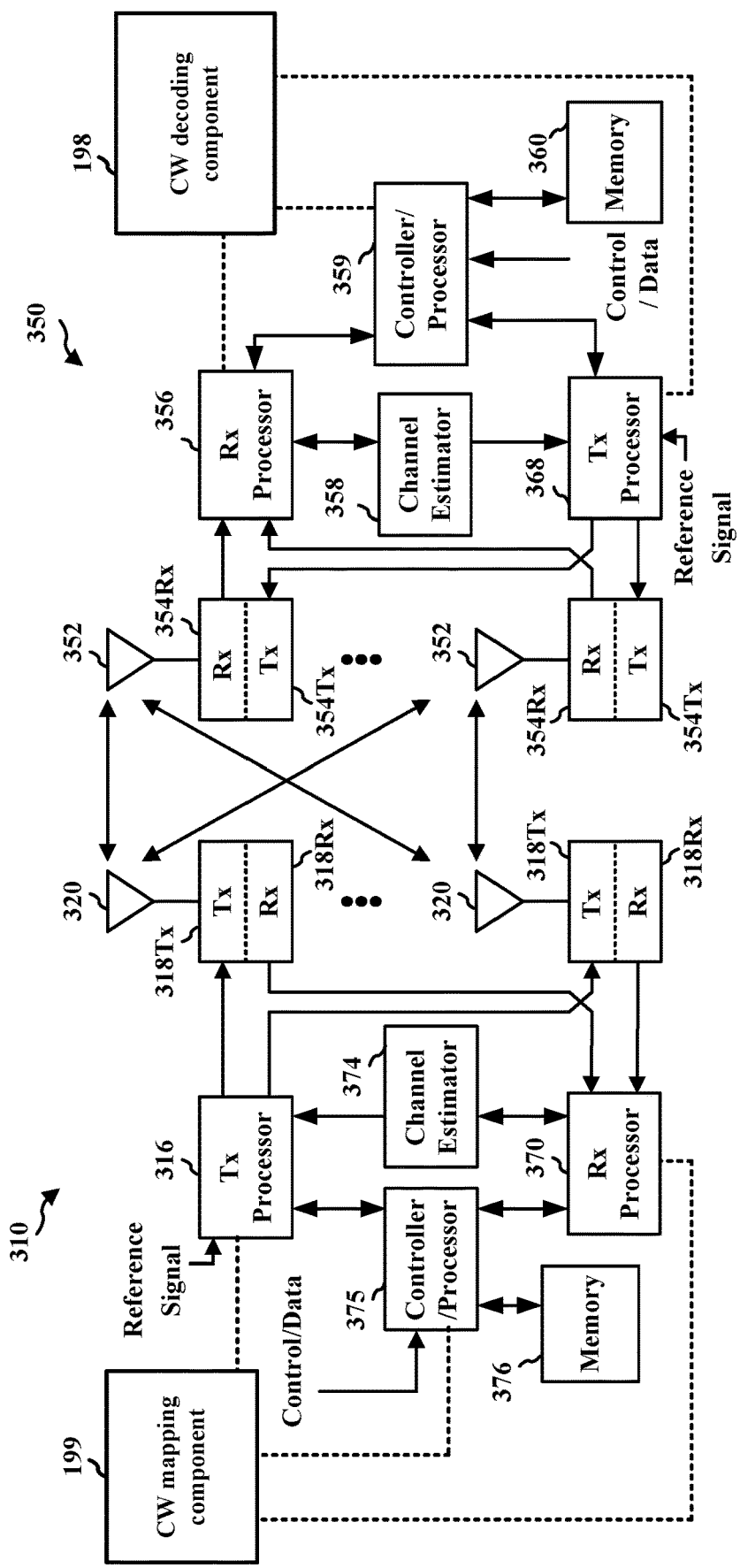
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CW decoding component 198 of FIG. 1.

At least one of the Tx processor 316, the Rx processor 370, and the controller/processor 375 may be configured to perform aspects in connection with the CW mapping component 199 of FIG. 1.

Figure 4:
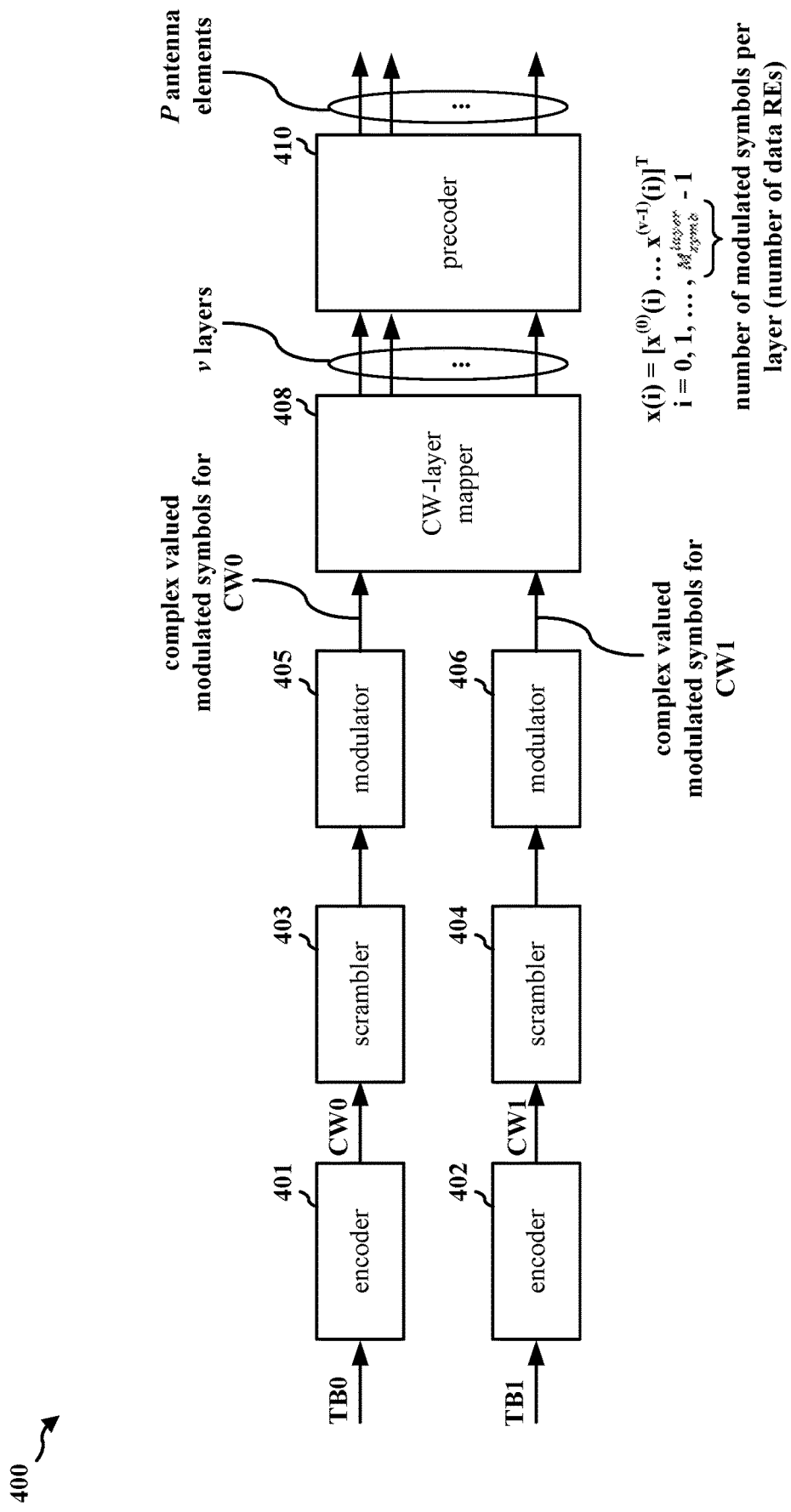
FIG. 4 is a diagram illustrating an example of a codeword layer mapping system for data transmitted by a network entity.

FIG. 4 is a diagram 400 illustrating an example of a codeword layer mapping system for data transmitted by a network entity, such as base station 102 in FIG. 1 or base station 310 in FIG. 3. A network entity transmitting data using a PDSCH may encode the data using one or more codewords (CWs). Multiple codewords may be used, for example, when a PDSCH has two or more layers or when a PDSCH has four or more layers. A TB may be separated into two TBs, such as TB0 and TB1. A network entity may process each TB0 and TB1 to generate complex valued modulated symbols for CW0 and CW1, respectively. In one aspect, an encoder 401 may encode the TB0 to generate a corresponding CW0. The encoder 401 may perform rate matching on the TB to extract a set of bits TB0 from the TB for a transmission time interval (TTI). A scrambler 403 may scramble the CW0 to generate a set of scrambled bits for CW0, and a modulator 405 may module the scrambled CW0 to generate a set of complex valued modulated symbols for the CW0 generated by the encoder 401. Similarly, an encoder 402 may encode the TB1 to generate a corresponding CW1 different from the CW0. The encoder 402 may perform rate matching on the TB to extract a set of bits TB1 from the TB for a TTI. A scrambler 404 may scramble the CW1 to generate a set of scrambled bits for CW1, and a modulator 406 may module the scrambled CW1 to generate a set of complex valued modulated symbols for the CW1 generated by the encoder 402.

The set of complex valued modulated symbols for the CW0 and the set of complex valued modulated symbols for the CW1 may be provided to the CW-layer mapper 408. The CW-layer mapper 408 may map the modulated symbols to a number of layers. The CW-layer mapper 408 may map the set of complex valued modulated symbols for the CW0 to a first set of layers and may map the set of complex valued modulated symbols for the CW1 to a second set of layers different from the first set of layers. The number of modulated symbols per layer may be defined as $M_{symb}^{layer}$ for a given PDSCH, or a number of data REs per layer. For example, in one aspect $M_{symb}^{layer}$ may equal 10 symbols per layer for a given PDSCH, and the CW-layer mapper 408 may map the modulated symbols to 10×v layers. $M_{symb}^{layer}$ may be different across different scheduling instances. For example, a different number of RBs, a different number of OFDM symbols, or different demodulation reference signal (DMRS) overhead between different scheduling instances may affect the value of $M_{symb}^{layer}$. The CW-layer mapper 408 may map the modulated symbols using the formula $x(i)=[x^{(0)}(i) \ldots x^{(v-1)}(i)]^T$, for each modulated symbol per layer from 0 to $M_{symb}^{layer}-1$. The precoder 410 may be configured to perform precoding on the REs of each of the layers. The precoder 410 may map the data to resources, such as antenna elements for transmission of the data.

In some aspects, a network entity may map one codeword to all of the MIMO layers of a PDSCH. In some aspects, a network entity may map two or more codewords to all of the layers of a PDSCH. In some aspects, a network entity may be configured to select a number of codewords used for a PDSCH data transmission based on the number of layers of the PDSCH. Table 1 illustrates an example configuration for codeword to layer mapping as a based on the number of layers for a PDSCH.

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
| | | $x^{(1)}(i) = d^{(0)}(2i + 1)$ | |
| 3 | 1 | $x^{(0)}(i) = d^{(0)}(3i)$ | $M_{symb}^{layer} = M_{symb}^{(0)}/3$ |
| | | $x^{(1)}(i) = d^{(0)}(3i + 1)$ | |
| | | $x^{(2)}(i) = d^{(0)}(3i + 2)$ | |
| 4 | 1 | $x^{(0)}(i) = d^{(0)}(4i)$ | $M_{symb}^{layer} = M_{symb}^{(0)}/4$ |
| | | $x^{(1)}(i) = d^{(0)}(4i + 1)$ | |
| | | $x^{(2)}(i) = d^{(0)}(4i + 2)$ | |
| | | $x^{(3)}(i) = d^{(0)}(4i + 3)$ | |
| 5 | 2 | $x^{(0)}(i) = d^{(0)}(2i)$ | $M_{symb}^{layer} = M_{symb}^{(0)}/2 = M_{symb}^{(1)}/3$ |
| | | $x^{(1)}(i) = d^{(0)}(2i + 1)$ | |
| | | $x^{(2)}(i) = d^{(1)}(3i)$ | |
| | | $x^{(3)}(i) = d^{(1)}(3i + 1)$ | |
| | | $x^{(4)}(i) = d^{(1)}(3i + 2)$ | |
| 6 | 2 | $x^{(0)}(i) = d^{(0)}(3i)$ | $M_{symb}^{layer} = M_{symb}^{(0)}/3 = M_{symb}^{(1)}/3$ |
| | | $x^{(1)}(i) = d^{(0)}(3i + 1)$ | |
| | | $x^{(2)}(i) = d^{(0)}(3i + 2)$ | |
| | | $x^{(3)}(i) = d^{(1)}(3i)$ | |
| | | $x^{(4)}(i) = d^{(1)}(3i + 1)$ | |
| | | $x^{(5)}(i) = d^{(1)}(3i + 2)$ | |
| 7 | 2 | $x^{(0)}(i) = d^{(0)}(3i)$ | $M_{symb}^{layer} = M_{symb}^{(0)}/3 = M_{symb}^{(1)}/4$ |
| | | $x^{(1)}(i) = d^{(0)}(3i + 1)$ | |
| | | $x^{(2)}(i) = d^{(0)}(3i + 2)$ | |
| | | $x^{(3)}(i) = d^{(1)}(4i)$ | |
| | | $x^{(4)}(i) = d^{(1)}(4i + 1)$ | |
| | | $x^{(5)}(i) = d^{(1)}(4i + 2)$ | |
| | | $x^{(6)}(i) = d^{(1)}(4i + 3)$ | |
| 8 | 2 | $x^{(0)}(i) = d^{(0)}(4i)$ | $M_{symb}^{layer} = M_{symb}^{(0)}/4 = M_{symb}^{(1)}/4$ |
| | | $x^{(1)}(i) = d^{(0)}(4i + 1)$ | |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(4i)$ | |

TABLE 1-continued

| Number of layers | Number of codewords | Codeword-to-layer mapping $i = 0, 1, \ldots, M_{symb}^{layer} - 1$ |
|---|---|---|
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

A network entity using the configuration of Table 1 may be configured to use one codeword for one, two, three, or four layers for a PDSCH, and may be configured to use two codewords for five, six, seven, or eight layers for a PDSCH. In an aspect with four or less layers (i.e., v≤4), the one codeword may be mapped to all layers, and the number of REs may be the number of coded bits divided by the number of layers and divided by the modulation order. In an aspect with more than four layers (i.e., v>4), a network entity may map modulated symbols of CW0 ($M_{symb}^{(0)}$ modulated symbols) may be mapped to the first $\lceil v/2 \rceil$ layers, and modulated symbols of CW1 ($M_{symb}^{(1)}$ modulated symbols) may be mapped to the remaining $\lfloor v/2 \rfloor$ layers. For example, for a PDSCH with 5 layers, a network entity may map the modulated symbols of the first CW (i.e., CW0) to the first two layers and may map the modulated symbols of the second CW (i.e., CW1) to the remaining three layers. The network entity may use DCI scheduling of a PDSCH having two codewords with two TBs, which may indicate two modulation and coding schemes (MCSs), two redundancy versions (RVs), and two new data indicators (NDIs) for the two CWs. In other words, the DCI may have two fields for MCS, RV, and NDI. Other parameters, such as time domain resource allocation (TDRA), frequency domain resource allocation (FDRA), or HARQ ID, may be the same for both codewords. In other words, the DCI may have one field for TDRA, FDRA, and HARQ ID. A network entity may use other configurations for codeword to layer mapping, such as configurations that have two CWs for two layers, or four CWs for four layers.

A DCI may indicate the number of layers for PDSCH and corresponding DMRS ports. There may be a one to one mapping between each layer and a DMRS port. An antenna ports field of the DCI may indicate the number of layers for PDSCH and corresponding DMRS ports whether the network entity assigns one, two, or more CWs to a scheduled PDSCH transmission. In one aspect, when one CW is disabled, up to four layers and corresponding DMRS ports may be indicated by a value in the antenna ports field. Table 2 illustrates an example mapping between a value in an antenna ports field of a DCI scheduling one CW for a PDSCH and DMRS ports corresponding to the value.

TABLE 2

| | One codeword: CW0 enabled CW1 disabled | | |
|---|---|---|---|
| Value | Number of DMRS CDM group(s) without data | DMRS port(s) | Number of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | Reserved | Reserved | Reserved |

In one aspect, when two CWs are enabled, more than four layers and corresponding DMRS ports may be indicated by a value in the antenna ports field. Table 3 illustrates an example mapping between a value in an antenna ports field of a DCI scheduling two CWs for a PDSCH and DMRS ports corresponding to the value.

TABLE 3

| | Two codewords: CW0 enabled CW1 enabled | | |
|---|---|---|---|
| Value | Number of DMRS CDM group(s) without data | DMRS port(s) | Number of front-load symbols |
| 0 | 2 | 0-4 | 2 |
| 1 | 2 | 0, 1, 2, 3, 4, 6 | 2 |
| 2 | 2 | 0, 1, 2, 3, 4, 5, 6 | 2 |
| 3 | 2 | 0, 1, 2, 3, 4, 5, 6, 7 | 2 |
| 4-31 | Reserved | Reserved | Reserved |

Figure 5:
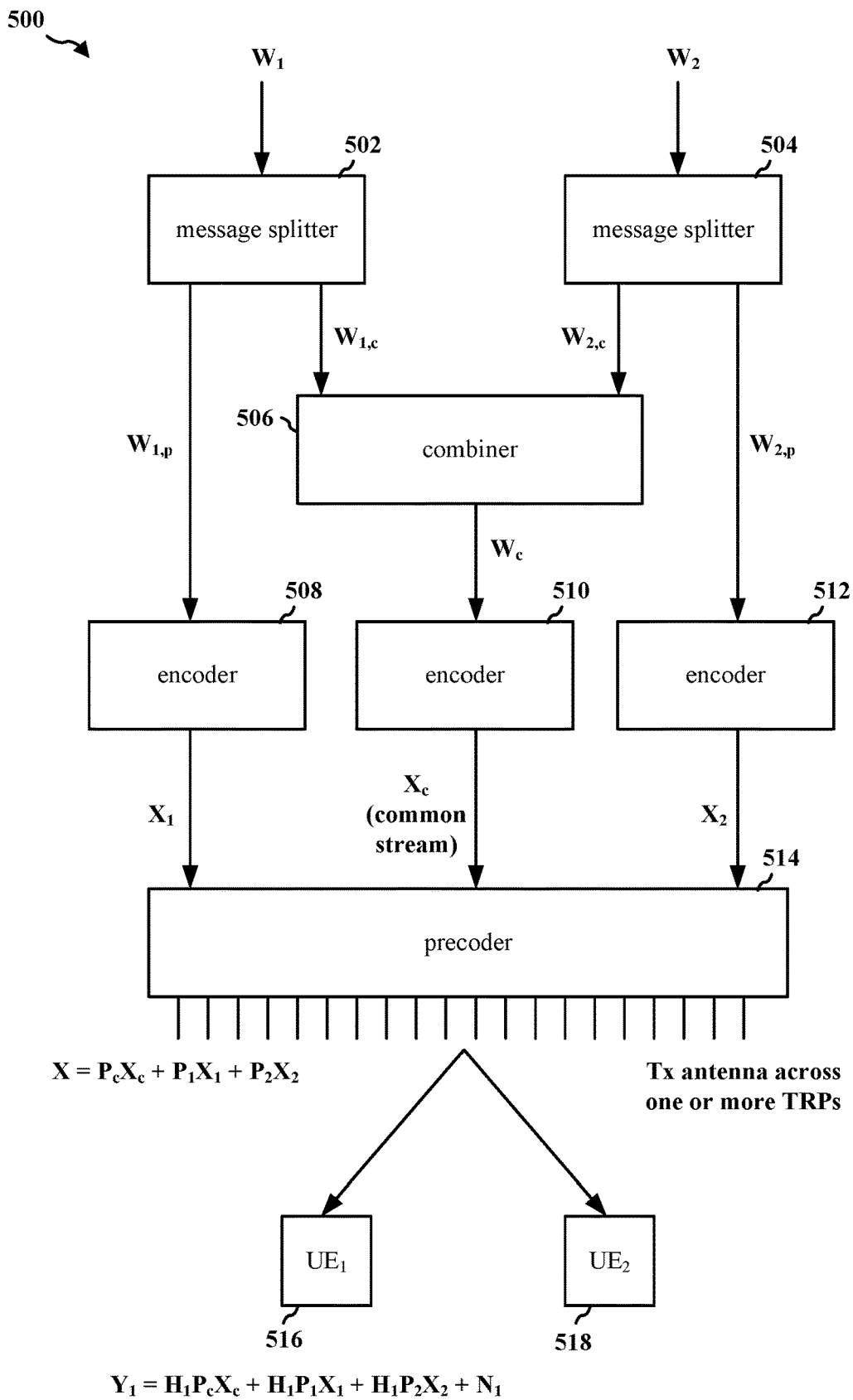
FIG. 5 is a diagram illustrating an example of a multi-user rate-splitting MIMO system at a transmitting network entity.

FIG. 5 is a diagram 500 illustrating an example of a multi-user rate-splitting MIMO system at a transmitting network entity, such as the base station 102 in FIG. 1. A rate-splitting system for broadcast channels may be able to achieve a larger degree of freedom and/or capacity. A network entity may have a message $W_1$ for a $UE_1$ 516 and a message $W_2$ for a $UE_2$ 518. Each message may be divided into a private portion and a public/common portion. The message splitter 502 may split the message $W_1$ for the $UE_1$ 516 into a private portion $W_{1,p}$ and a common portion $W_{1,c}$. Similarly, the message splitter 504 may split the message $W_2$ for the $UE_2$ 518 into a private portion $W_{2,p}$ and a common portion $W_{2,c}$. The combiner 506 may combine the common portion $W_{1,c}$ and the common portion $W_{2,c}$ into a common message $W_c$. The combiner 506 may concatenate the common portion $W_{1,c}$ and the common portion $W_{2,c}$ to generate the common message $W_c$. The encoder 510 may encode the common message $W_c$ to generate the encoded common portion $X_c$, which also may be referred to as a common stream. The common stream may have one or more layers. The encoder 510 may also modulate the common message $W_c$ and map the data to one or more layers, for example by using a CW-layer mapping system, in addition to encoding the common message $W_c$. The precoder 514 may precode the encoded common portion $X_c$ by $P_c$, and may transmit the portion $P_c X_c$ by one or more transmitting antennas (i.e., from one or more transmission and reception points (TRPs)).

The encoder 508 may encode the private portion $W_{1,p}$ to generate the encoded private portion $X_1$ for the $UE_1$ 516, which also may be referred to as a private stream for the $UE_1$ 516. The private stream may have one or more layers. The encoder 508 may also modulate the private portion $W_{1,p}$ and map the data to one or more layers, for example by using a CW-layer mapping system, in addition to encoding the private portion $W_{1,p}$. The precoder 514 may precode the encoded private portion $X_1$ by $P_1$, and may transmit the portion $P_1 X_1$ by one or more transmitting antennas/TRPs. The encoder 512 may encode the private portion $W_{2,p}$ to generate the encoded private portion $X_2$ for the $UE_2$ 518, which also may be referred to as a private stream for the $UE_2$ 518. The private stream may have one or more layers. The encoder 512 may also modulate the private portion $W_{2,p}$ and map the data to one or more layers, for example by using a CW-layer mapping system, in addition to encoding the private portion $W_{2,p}$. The precoder 514 may precode the encoded private portion $X_2$ by $P_2$, and may transmit the portion $P_2 X_2$ by one or more transmitting antennas/TRPs.

The entire signal output by the precoder 514 may be represented by $X = P_c X_c + P_1 X_1 + P_2 X_2$, where $P_1 X_1$ may represent a private portion of the message associated with the $UE_1$ 516, $P_2 X_2$ may represent a private portion of the message associated with the $UE_2$ 518, and $P_c X_c$ may represent a common portion of the message associated with both the $UE_1$ 516 and the $UE_2$ 518. The transmitted signal X may be transmitted to the $UE_1$ 516 using the $H_1$ channel for the $UE_1$ 516. The signal received by the $UE_1$ 516 may be represented by $Y_1 = H_1 P_c X_c + H_1 P_1 X_1 + H_1 P_2 X_2 + N_1$, where $H_1 P_c X_c$ may represent a private portion of the message associated with the $UE_1$ 516 received via the $H_1$ channel for the $UE_1$ 516, $H_1 P_2 X_2$ may represent a private portion of the message associated with the $UE_2$ 518 received via the $H_1$ channel for the $UE_1$ 516, $H_1 P_c X_c$ may represent a common portion of the message associated with both the $UE_1$ 516 and the $UE_2$ 518 received via the $H_1$ channel for the $UE_1$ 516, and $N_1$ may represent the noise of the signal $Y_1$. Similarly, the transmitted signal X may be transmitted to the $UE_2$ 518 using the $H_2$ channel for the $UE_2$ 518. The signal received by the $UE_2$ 518 may be represented by $Y_2 = H_2 P_c X_c + H_2 P_1 X_1 + H_2 P_2 X_2 + N_2$, where $H_2 P_c X_c$ may represent a private portion of the message associated with the $UE_1$ 516 received via the $H_2$ channel for the $UE_2$ 518, $H_2 P_2 X_2$ may represent a private portion of the message associated with the $UE_2$ 518 received via the $H_2$ channel for the $UE_2$ 518, $H_2 P_c X_c$ may represent a common portion of the message associated with both the $UE_1$ 516 and the $UE_2$ 518 received via the $H_2$ channel for the $UE_2$ 518, and $N_2$ may represent the noise of the signal $Y_2$.

Figure 6:
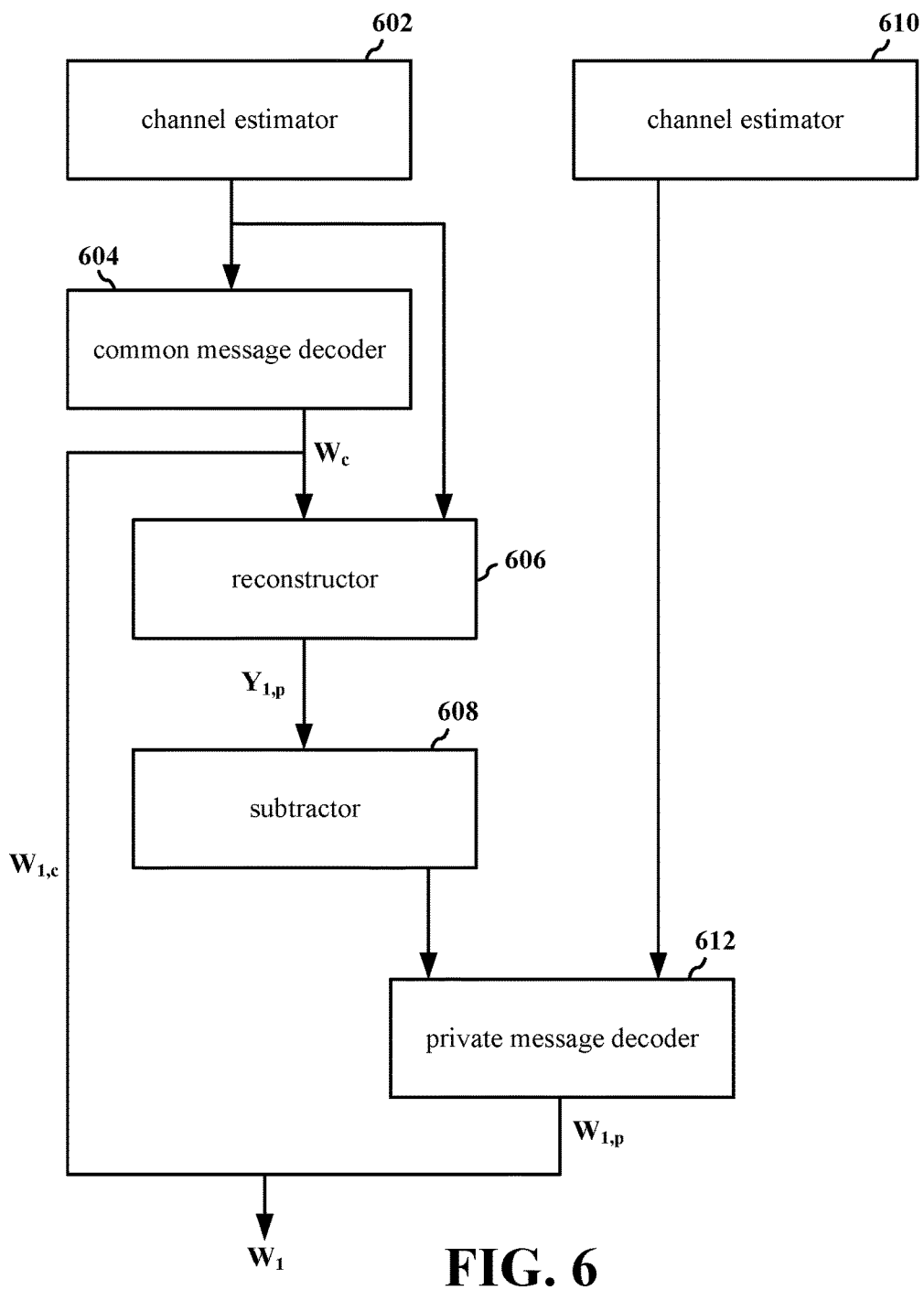
FIG. 6 is a diagram illustrating an example of a multi-user rate-splitting MIMO system at a receiving UE.

FIG. 6 is a diagram 600 illustrating an example of a multi-user rate-splitting MIMO system at a receiving UE, such as the UE 104 in FIG. 1. The $UE_1$ 516 in FIG. 5 may receive the signal $Y_1 = H_1 P_c X_c + H_1 P_1 X_1 + H_1 P_2 X_2 + N_1$, and be configured to decode the common portion $H_1 P_c X_c$ and the private portion $H_1 P_1 X_1$ to reconstruct the message for the $UE_1$-$W_1$. At the receiver side, the $UE_1$ 516 may first decode the common message using the common message decoder 604 for two purposes. The first purpose may be to retrieve the common portion $W_{1,c}$, since a part of the individual message for each UE (e.g., $W_{1,c}$ for the $UE_1$ 516 and $W_{2,c}$ for the $UE_2$ 518) may be embedded in the common message $W_c$. The second purpose may be to perform successive interference cancellation on the signal Y1 to decode the private portion $W_{1,p}$. An alternative to successive interference cancellation may be joint demodulation and/or decoding of the common message $W_c$ and the private portion $W_{1,p}$. In one aspect, the $UE_1$ 516 may perform joint demodulation to generate log likelihood ratios or LLRs. In one aspect, the $UE_1$ 516 may additionally or alternatively perform joint decoding. In one aspect, the common message $W_c$ may include part of the individual message for one UE and not for other UEs. In other words, in one aspect $W_c$ may include $W_{2,c}$ and may not include $W_{1,c}$. In such aspects, the $UE_1$ 516 may decode and/or demodulate $W_c$ to decode the private portion $W_{1,p}$, as explained below.

The channel estimator 602 may estimate the effective channel $H_1 P_c$ corresponding with the received common stream $H_1 P_c X_c$. The common message decoder 604 may use the channel estimate (CE) for the received common stream to decode the common message $W_c$, which may be a concatenation of the common portion $W_{1,c}$ and the common portion $W_{2,c}$. The common message decoder 604 may also perform demodulation and demapping on the common stream $H_1 P_c X_c$ of the signal $Y_1$ in addition to decoding. The reconstructor 606 may reconstruct the received common stream $H_1 P_c X_c$ from the common message $W_c$ by re-encoding the common message $W_c$ to generate an estimate of the common stream $X_c$, and multiply the estimate of the effective channel $H_1 P_c$ with the estimate of the common stream $X_c$ to obtain an estimate of the received common stream $H_1 P_c X_c$. The subtractor 608 may subtract the estimate of the received common stream $H_1 P_c X_c$ from the signal $Y_1$ to perform interference cancellation on the signal $Y_1$. Assuming perfect channel estimation by the channel estimator 602 and successful decoding by the common message decoder 604, the subtractor may be able to clean up the signal $Y_1 = H_1 P_c X_c + H_1 P_1 X_1 + H_1 P_2 X_2 + N_1$ by subtracting the estimate of the received common stream $H_1 P_c X_c$ to obtain an estimate of $Y_{1,p} = Y_1 - H_1 P_c X_c = H_1 P_1 X_1 + H_1 P_2 X_2 + N_1$.

The channel estimator 610 may estimate the effective channel $H_1 P_1$ corresponding with the received private stream $H_1 P_1 X_1$. The private message decoder 612 may use the estimate of the effective channel $H_1 P_1$ and the estimate of $Y_{1,p}$ to decode the private portion $W_{1,p}$. The private message decoder 612 may also perform demodulation and demapping on the private stream $H_1 P_1 X_1$ of the signal $Y_1$ in addition to decoding. The common portion $W_{1,c}$ and the private portion $W_{1,p}$ may be concatenated to obtain the message $W_1$ for the $UE_1$ 516. In some aspects, the $UE_1$ 516 may be configured to jointly demodulate and/or decode the private stream and the public stream without performing interference cancellation to decode the private portion $W_{1,p}$ of the message $W_1$ for the $UE_1$ 516.

In some aspects, a multi-user rate-splitting MIMO system may co-schedule each UE with a PDSCH that includes at least two CWs/TBs—a common CW (c-CW) and a private CW (p-CW). A network entity may include a plurality of c-CWs or a plurality of p-CWs. In one aspect, with three co-scheduled UEs—UE1, UE2, and UE3—a first c-CW may be intended for UE1 and UE2, while a second c-CW may be intended for UE1 and UE3. To generate a plurality of c-CWs, a multi-user rate-splitting MIMO system may use a plurality of combiners and encoders for each common stream. In another aspect, a first c-CW may be intended for UE1 and UE2, while a second c-CW may be intended for UE1, UE2, and UE3. In another aspect, a private stream may have more than four layers and may use Table 1 to configure CWs for a PDSCH, resulting in a mapping of two p-CWs for the more than four layers of the PDSCH for a UE. To generate a plurality of p-CWs for a UE, a multi-user rate-splitting MIMO system may use a plurality of encoders for each p-CW of a UE.

However, a fixed configuration for codeword to layer mapping, such as Table 1, may not be flexible enough for some aspects. In one problem aspect, a first UE may have six layers while a second UE may have two layers. Table 1 may designate 3+3 layers for the two CWs of the first UE. However, if the c-CW of the first UE has three layers, the second UE may not be scheduled with the c-CW of the first UE because the second UE having two layers may not be able to read the third layer of the first UE's c-CW. Table 1 may also designate two layers for the one CW of the second UE, which prevents the second UE from having both a c-CW and a p-CW. In another problem aspect, a first UE may have six layers and the common-layer may have a rank of one to allow a worst UE having one layer to decode the c-CW. However, Table 1 does not allow a split of 1+5, and allows a split of 3+3 for a six layer PDSCH. Moreover, a split of 5 layers for a single p-CW may not perform well, since all five layers may not have an equal signal to noise ratio (SINR). A split of two p-CWs for 5 layers may be preferred to provide a first MCS for layers having a first SINR and a second MCS for layers having a second SINR. In another problem aspect, a first UE, a second UE, a third UE, and a fourth UE may be co-scheduled with rate-splitting. The first UE may have a better rate region if it has two c-CWs (e.g., one c-CW to be decoded by the first UE and the second UE, and another c-CW to be decoded by the first UE, the second UE, the third UE, and the fourth UE). However, for the first UE to have two c-CWs and one p-CW, the network entity may associate three CWs with the UE, which is not supported by the fixed configuration for codeword to layer mapping in Table 1.

A dynamic configuration for codeword to layer mapping may have a first UE configured to receive a first indication of a mapping of a plurality of layers to a first c-CW and a first p-CW from a network entity. The first indication may indicate that the first c-CW corresponds to at least one first layer of the plurality of layers and that the first p-CW corresponds to at least one second layer of the plurality of layers. The plurality of layers may be associated with MIMO communication. The first c-CW and the first p-CW may be associated with rate-splitting for the MIMO communication. The first UE may be configured to identify a first set of modulated symbols of the first c-CW that is mapped to the at least one first layer and a second set of modulated symbols of the first p-CW that is mapped to the at least one second layer based on the first indication. The first UE may be configured to perform a decoding process for at least one of the first c-CW or the first p-CW based on at least one of the first set of modulated symbols or the second set of modulated symbols.

A network entity may be configured to map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. The network entity may be configured to transmit a first indication of the mapping of the plurality of layers to the first c-CW and the first p-CW for a first UE. The first indication may indicate that the first c-CW corresponds to the at least one first layer and the first p-CW corresponds to the at least one second layer.

Figure 7:
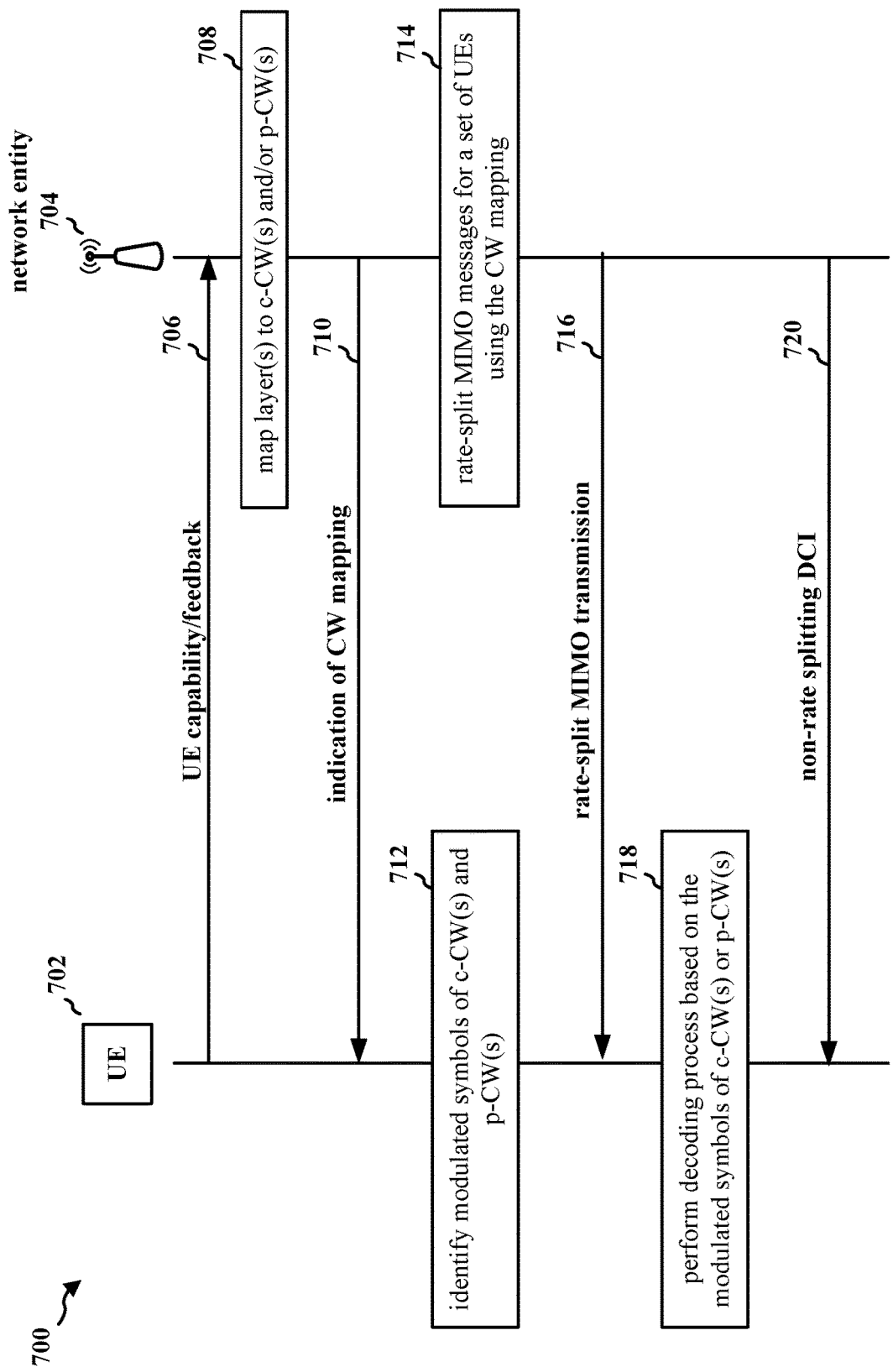
FIG. 7 is a connection flow diagram illustrating an example of a dynamic configuration for codeword to layer mapping between a UE and a network entity.

FIG. 7 is a connection flow diagram 700 illustrating an example of a dynamic configuration for codeword to layer mapping between a UE 702 and a network entity 704.

The UE 702 may be configured to transmit UE capability/feedback 706 to the network entity 704. The UE 702 may indicate the maximum number of layers for a c-CW (i.e., $v_c^{max}$) in a UE capability signal as the capability/feedback 706. The UE 702 may indicate the maximum number of layers for a p-CW (i.e., $v_p^{max}$). The sum of $v_c^{max}+v_p^{max}$ supported by the UE 702 for rate-splitting MIMO in a given band or component carrier (CC) may be different than the max number of layers supported by the UE 702 for regular MIMO (i.e., MIMO communication that does not use rate-splitting). In other words, the UE 702 may transmit a UE capability signal as the UE capability/feedback 706 indicating the maximum number of layers for a MIMO transmission without rate splitting (i.e., $v_{regular}^{max}$), and of $v_c^{max}+v_p^{max}$ may or may not be equal to $v_{regular}^{max}$.

The UE 702 may indicate the maximum number of c-CWs in the presence of one or more p-CWs (i.e., c-CW$^{max}$) in a UE capability signal as the capability/feedback 706. The UE 702 may indicate the maximum number of p-CWs in the presence of one or more c-CWs (i.e., p-CW$^{max}$) in a UE capability signal as the capability/feedback 706.

The UE 702 may indicate the maximum supported number of layers for each c-CW in a UE capability signal as the capability/feedback 706. For example, in response to the UE 702 supporting two c-CWs and one p-CW, the UE 702 may indicate a $v_{c,1}^{max}$, a $v_{c,2}^{max}$, and a $v_p^{max}$. The UE 702 may indicate the maximum number of p-CWs in the presence of one or more c-CWs (i.e., p-CW$^{max}$) in a UE capability signal as the capability/feedback 706. The UE 702 may indicate the maximum supported number of layers for each p-CW. For example, in response to the UE 702 supporting two p-CWs and one c-CW, the UE 702 may indicate a $v_c^{max}$, a $v_{p,1}^{max}$, and a $v_{p,2}^{max}$. In response to the UE 702 supporting two p-CWs and two c-CWs, the UE 702 may indicate a $v_{c,1}^{max}$, a $v_{c,2}^{max}$, a $v_{p,1}^{max}$, and a $v_{p,2}^{max}$.

The UE 702 may indicate the maximum supported number of layers for all c-CWs in a UE capability signal as the capability/feedback 706. For example, in response to the UE 702 supporting two c-CWs and one p-CW, the UE 702 may indicate a $v_c^{max}$ and a $v_p^{max}$, where $v_c^{max}$ may be the maximum supported number of layers for both of the c-CWs of the UE 702. In other words, $v_{c,1}+v_{c,2} \leq v_c^{max}$. Similarly, the UE 702 may indicate the maximum supported number of layers for all p-CWs. For example, in response to the UE 702 supporting two p-CWs and one c-CW, the UE 702 may indicate a $v_c^{max}$ and a $v_p^{max}$, where $v_p^{max}$ may be the maximum supported number of layers for both of the p-CWs of the UE 702. In other words, $v_{p,1}+v_{p,2} \leq v_p^{max}$.

The UE 702 may transmit feedback associated with at least one of channel state information (CSI) or an SRS from the network entity 704 as the capability/feedback 706.

The network entity 704 may obtain the capability/feedback 706. At 708, the network entity 704 may use at least a portion of the obtained UE capability/feedback 706 to map one or more layers to one or more c-CWs or map one or more layers to one or more p-CWs. The network entity 704 may use $v_c^{max}/v_p^{max}$ information to ensure that a c-CW or a p-CW assigned to the UE 702 does not exceed the layer capabilities of the UE 702. The network entity 704 may use $v_c^{max}$ information to ensure that, for a c-CW scheduled to be decoded by multiple UEs, the indicated rank of the c-CW is not larger than $v_c^{max}$ of any of the co-scheduled UEs. The network entity 704 may use c-CW$^{max}$ information to ensure that a number of c-CWs assigned to the UE 702 does not exceed the c-CW$_{max}$ of the UE 702. The network entity 704 may use the p-CW$_{max}$ information to ensure that a number of p-CWs assigned to the UE 702 does not exceed the p-CW$^{max}$ of the UE 702. The network entity 704 may use $v_{c,1}^{max}/v_{c,2}^{max}$ information to ensure that a number of layers assigned to each of the two c-CWs of the UE 702 does not exceed the $v_{c,1}^{max}/v_{c,2}^{max}$ of the UE 702, respectively. The network entity 704 may use $v_{p,1}^{max}/v_{p,2}^{max}$ information to ensure that a number of layers assigned to each of the two p-CWs of the UE 702 does not exceed the $v_{p,1}^{max}/v_{p,2}^{max}$ of the UE 702, respectively. The network entity 704 may use $v_c^{max}$ information to ensure that the sum of the number of layers assigned to each of the c-CWs of the UE 702 does not exceed the $v_c^{max}$ of the UE 702. The network entity 704 may use $v_p^{max}$ information to ensure that the sum of the number of layers assigned to each of the p-CWs of the UE 702 does not exceed the $v_p^{max}$ of the UE 702. The network entity 704 may map one or more layers to one or more c-CWs or map one or more layers to one or more p-CWs based on the CSI or SRS feedback to optimize a performance of the UE 702.

The network entity 704 may output an indication 710 of the CW mapping to the UE 702. The UE 702 may receive the indication 710 of the CW mapping. The indication 710 may be transmitted in DCI scheduling a PDSCH of the UE 702. The DCI may indicate the number of layers for each c-CW and each p-CW of the UE 702 separately in DCI. In one aspect, the DCI may have a field that indicates a number of layers mapped to a c-CW (i.e., $v_c$) and another field that indicates a number of layers mapped to a p-CW (i.e., $v_p$). The field may indicate the number of layers by providing a value of the number of layers, or may select the number of layers via an index to a table, for example a table that is provided to the UE 702 in an RRC configuration. In one aspect, the DCI may have a field that indicates both $v_c$ and $v_p$. The field may indicate the number of layers by providing concatenated values of the number of layers, or may select the number of layers for both $v_c$ and $v_p$ via an index to a table, for example a table that is provided to the UE 702 in an RRC configuration. The DCI field(s) may also indicate one or more DMRS ports associated with the c-CW or p-CW, respectively, in addition to indicating the number of layers.

The network entity 704 may be configured to dynamically schedule a rate-splitting MIMO transmission or a non-rate splitting MIMO transmission (i.e., a regular MIMO operation) by using DCI that has the same size to schedule the rate-splitting MIMO transmission as DCI that schedules the non-rate splitting MIMO transmission. In one aspect, DCI that schedules the non-rate splitting MIMO transmission may have two fields or one joint field that indicates $v_c$ and $v_p$ with a total bit width of Y. DCI that schedules the non-rate splitting MIMO transmission may indicate the number of layers for the non-rate splitting MIMO transmission using a field with a bit-width of X. In aspects where Y is greater than X, DCI that schedules the non-rate splitting MIMO transmission may have zero-padding to ensure that both of the DCIs have the same size. In other words, where the indication 710 of CW mapping includes DCI that schedules a rate-splitting MIMO transmission, and where the network entity 704 transmits non-rate splitting DCI 720 to the UE 702 to schedule a non-rate splitting MIMO transmission, the DCI 720 and the DCI of the indication 710 of CW mapping may be equal to one another.

In one aspect, a DCI having the indication 710 of the CW mapping may have an antenna port field that may be used to indicate a total number of layers v. The antenna port field may also indicate one or more DMRS ports via a table, such as the Table 1, with a first column having one or more DMRS ports and another column indicating a total number of layers v. The DCI may also have a field that indicates $v_c$. In response to receiving the v and the $v_c$ via the indication 710 of the CW mapping, the UE may calculate $v_p$ as $v-v_c$. Alternatively, the DCI may also have a field that indicates $v_p$. In response to receiving the v and the $v_p$ via the indication 710 of the CW mapping, the UE may calculate v as $v-v_p$. In one aspect, the DCI may dynamically indicate the presence of a c-CW using a flag. In response to receiving an indication in the DCI that the DCI does not schedule a transmission with a c-CW, the UE 702 may ignore the field that normally contains $v_c$ or $v_p$ information, or may reallocate that field to a different purpose based on the flag.

In one aspect, the number of layers of the c-CW for the UE 702 may be fixed (e.g., $v_c=1$). For example, the UE 702 may provide a UE capability/feedback 706 to the network entity 704 that $v_c^{max}=1$ or the network entity 704 may send an RRC configuration to the UE 702 to set the number of layers of the c-CW for the UE 702 to one. If the number of layers of the c-CW for the UE 702 is fixed, the DCI having the indication 710 of the CW mapping may have an antenna port field that may be used to indicate a number of layers mapped to a p-CW (i.e., $v_p$) instead of indicating the total number of layers. If the UE 702 knows that $v_c=1$, the UE 702 may not calculate $v_c$. The DMRS port associated with the one layer of the c-CW may be fixed, for example DMRS port #0 if $v_c=1$. If the number of layers of the c-CW for the UE 702 is fixed, the DCI having the indication 710 of the CW mapping may have an antenna port field that may be used to indicate a total number of layers v. The UE 702 may then calculate $v_p$ as $v-v_c$. If $v_c=1$, the DMRS port associated with the one layer of the c-CW may be the first indicated DMRS port indicated by the antenna ports field (e.g., in a table similar to Table 1). In one aspect, the DCI may dynamically indicate the presence of a c-CW using a flag. In response to receiving an indication in the DCI that the DCI does not schedule a transmission with a c-CW, the UE 702 may assume the DCI schedules a non-rate split MIMO transmission with $v_c=0$ (no common CW).

In one aspect, a DCI having the indication 710 of the CW mapping may indicate a $v_{c,1}$ associated with a first c-CW and a $v_{c,2}$ associated with a second c-CW. The indication may also indicate corresponding DMRS ports for the first c-CW and the second c-CW. The UE 702 may calculate a $v_c$ value as the sum of $v_{c,1}$ and $v_{c,2}$. (i.e., $v_c = v_{c,1} + v_{c,2}$).

In one aspect, a DCI having the indication 710 of the CW mapping may indicate a $v_c$, and the UE 702, preconfigured to have a first c-CW and a second c-CW or receiving an indication that the DCI schedules a transmission having a first c-CW and a second c-CW, may determine that $v_{c,1}$ and $v_{c,2}$ are based on a split. In other words, the UE 702 may determine that the first $v_c/2$ layers (rounded up or rounded down if $v_c$ is odd) are associated with the first c-CW and that the remaining $v_c-v_c/2$ layers are associated with the second c-CW. The indication may also indicate corresponding DMRS ports for the first and second c-CWs, which may be also allocated to the first and second c-CWs based on the order of the DMRS ports.

In one aspect, a DCI having the indication 710 of the CW mapping may indicate a number of c-CWs. For example, the indication 710 of the CW mapping may indicate whether or not c-CW is scheduled. If c-CW is not scheduled, the UE 702 may determine the DCI to schedule a non-rate splitting MIMO transmission. If c-CW is scheduled, the indication 710 may indicate a number of c-CWs (e.g., one or two). The UE 702 may be configured to have a fixed value for the $v_{c,1}$ and $v_{c,2}$ (e.g., $v_{c,1}=v_{c,2}=1$). The UE 702 may then determine the DMRS ports based on the number of c-CWs. For example, if one c-CW is indicated by the DCI, and $v_{c,1}=v_{c,2}=1$, then the c-CW may have DMRS port #0. In another aspect, if two c-CWs are indicated by the DCI, and $v_{c,1}=v_{c,2}=1$, then the first c-CW may have DMRS port #0 and the second c-CW may have DMRS port #1.

In one aspect, a DCI having the indication 710 of the CW mapping may indicate a $v_{p,1}$ associated with a first p-CW and a $v_{p,2}$ associated with a second p-CW. The indication may also indicate corresponding DMRS ports for the first p-CW and the second p-CW. The UE 702 may calculate a $v_p$ value as the sum of $v_{p,1}$ and $v_{p,2}$ (i.e., $v_p=v_{p,1}+v_{p,2}$). The network entity 704 may be configured to schedule more than one p-CW for a rate-split MIMO transmission if the number of layers in the private stream of the UE 702 is greater than four.

In one aspect, a DCI having the indication 710 of the CW mapping may indicate a $v_p$, and the UE 702, preconfigured to have a first p-CW and a second p-CW or receiving an indication that the DCI schedules a transmission having a first p-CW and a second p-CW, may determine that $v_{p,1}$ and $v_{p,2}$ are based on a split. In other words, the UE 702 may determine that the first $v_p/2$ layers (rounded up or rounded down if $v_p$ is odd) are associated with the first p-CW and that the remaining $v_p-v_p/2$ layers are associated with the second p-CW. The indication may also indicate corresponding DMRS ports for the first and second p-CWs, which may be also allocated to the first and second p-CWs based on the order of the DMRS ports.

At 712, the UE 702 may identify modulated symbols of the one or more c-CWs and the modulated symbols of the one or more p-CWs. In aspects with one c-CW, once the UE 702 obtains the value of $v_c$ from the indication 710 of CW mapping, the UE may determine the number of modulated symbols for the c-CW as $M_{symb}^{c-CW}=v_c \times M_{symb}^{layer}$. Similarly, in aspects with one p-CW, once the UE 702 obtains the value of $v_p$ from the indication 710 of CW mapping, the UE may determine the number of modulated symbols for the p-CW as $M_{symb}^{p-CW}=v_p \times M_{symb}^{layer}$. As mentioned above, $M_{symb}^{layer}$ may be defined as the number of modulated symbols per layer. This may be defined by UE capability as the UE capability/feedback 706, or may be RRC configured by the network entity 704. The $M_{symb}^{layer}$ value may be fixed for a given PDSCH. In other words, the $M_{symb}^{layer}$ value may not change across different layers for a given PDSCH. However, the $M_{symb}^{layer}$ value may be different across different scheduling instances, since a number of RBs, a number of ODFM symbols, or a DMRS overhead may affect the $M_{symb}^{layer}$ value.

The network entity 704 may configure the layers associated with the c-CW to be consecutive and the layers associated with the p-CW to be consecutive. Such a configuration may be useful to determine the layers associated with the c-CW and the p-CW while minimizing overhead—particularly if the order of the layers associated with the c-CW and the layers associated with the p-CW are fixed as well (e.g., the c-CW layers are always before the p-CW layers or vice-versa). In one aspect, if a transmission has one c-CW and one p-CW, the modulated symbols of the c-CW may be mapped to the first $v_c$ layers of the PDSCH, and the modulated symbols of the p-CW may be mapped to the remaining $v_p$ layers of the PDSCH. In other words, c-CW may be the first CW and the p-CW may be the second CW. In another aspect, if a transmission has one c-CW and one p-CW, the modulated symbols of the p-CW may be mapped to the first $v_p$ layers of the PDSCH, and the modulated symbols of the c-CW CW may be mapped to the remaining $v_c$ layers of the PDSCH. In other words, p-CW may be the first CW and the c-CW may be the second CW.

In aspects with two c-CWs, once the UE 702 obtains the value of $v_{c,1}$ and $v_{c,2}$ from the indication 710 of CW mapping, the UE may determine the number of modulated symbols for the first c-CW as $M_{symb}^{c-CW,1}=v_{c,1} \times M_{symb}^{layer}$ and for the second c-CW as $M_{symb}^{c-CW,2}=v_{c,2} \times M_{symb}^{layer}$. Similarly, in aspects with two p-CWs, once the UE 702 obtains the value of $v_{p,1}$ and $v_{p,2}$ from the indication 710 of CW mapping, the UE may determine the number of modulated symbols for the first p-CW as $M_{symb}^{p-CW,1}=v_{p,1} \times M_{symb}^{layer}$ and for the second c-CW as $M_{symb}^{p-CW,2}=v_{p,2} \times M_{symb}^{layer}$.

At 714, the network entity 704 may rate-split MIMO messages for a set of UEs using the CW mapping generated at 708. The set of UEs may include the UE 702. The network entity 704 may output the rate-split MIMO transmission 716 to the UE 702. The UE 702 may receive the rate-split MIMO transmission from the network entity 704. At 718, the UE 702 may perform a decoding process on the rate-split MIMO transmission 716 based on the identified modulated symbols of the c-CW(s) and the p-CW(s).

Figure 8:
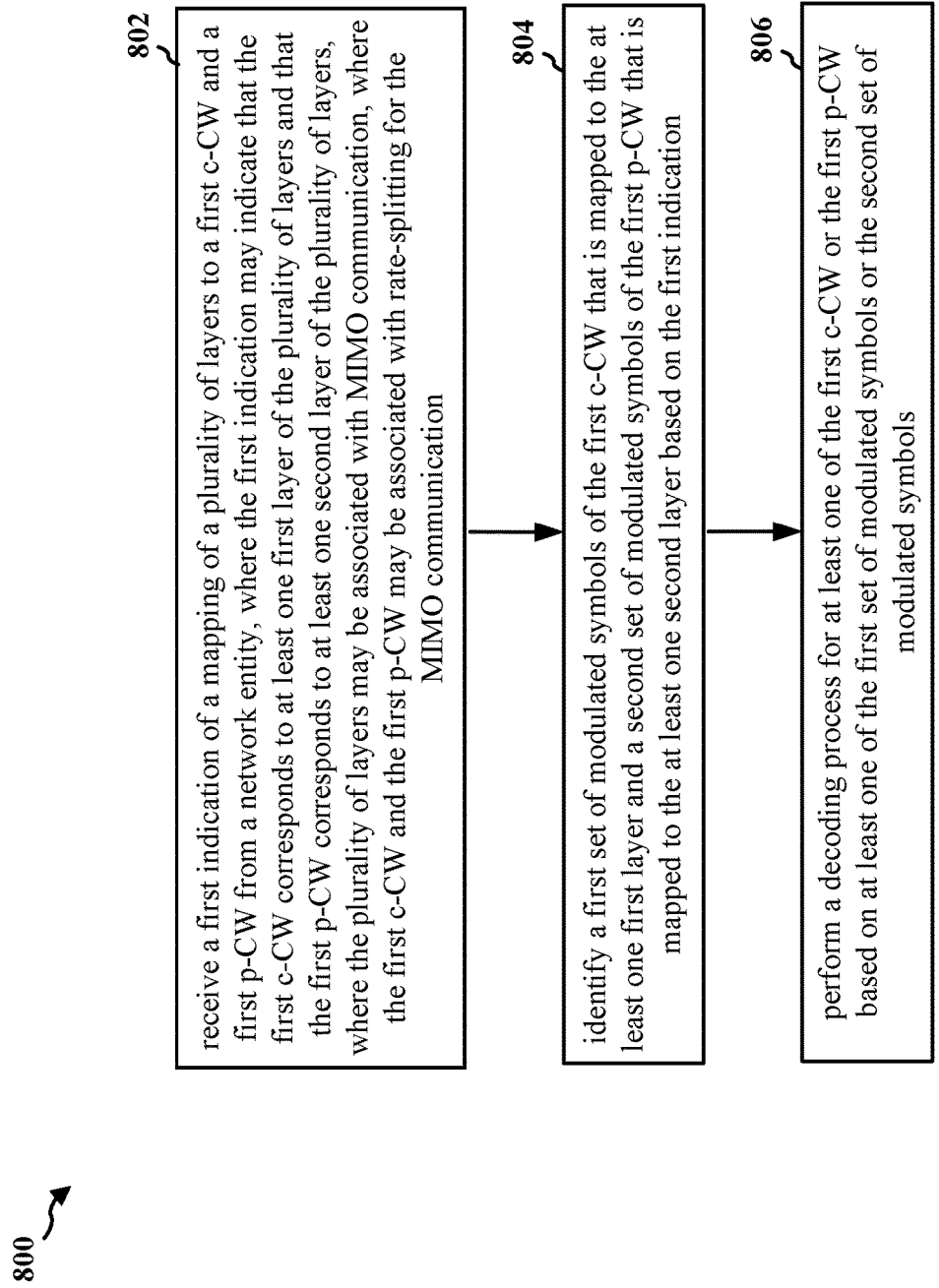
FIG. 8 is a flowchart of a method of wireless communication.

FIG. 8 is a flowchart 800 of a method of wireless communication. The method may be performed by a UE (e.g., the UE 104, the UE 350, the UE 702; the apparatus 1504). At 802, the UE may receive a first indication of a mapping of a plurality of layers to a first c-CW and a first p-CW from a network entity. The first indication may indicate that the first c-CW corresponds to at least one first layer of the plurality of layers. The first indication may additionally or alternatively indicate that the first p-CW corresponds to at least one second layer of the plurality of layers. The plurality of layers may be associated with MIMO communication. The first c-CW and the first p-CW may be associated with rate-splitting for the MIMO communication. For example, 802 may be performed by the UE 702 in FIG. 7, which may receive an indication 710 of the CW mapping of a plurality of layers to a first c-CW and a first p-CW from a network entity, such as a first set of layers to a first c-CW and a second set of layers to a first p-CW. The indication 710 of the CW mapping may indicate that the first c-CW corresponds to the first set of layers of the plurality of layers. The indication 710 of the CW mapping may additionally or alternatively indicate that the first p-CW corresponds to the second set of layers of the plurality of layers. The first and second set of layers may be different from one another. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 802 may be performed by the component 198 of the apparatus 1504 in FIG. 15.

At 804, the UE may identify a first set of modulated symbols of the first c-CW that is mapped to the at least one first layer and a second set of modulated symbols of the first p-CW that is mapped to the at least one second layer based on the first indication. For example, 804 may be performed by the UE 702 in FIG. 7, which, at 712, may identify a set of modulated symbols of the first c-CW that is mapped to the first set of layers based on the indication 710 of the CW mapping. At 712, the UE 702 may alternatively or additionally identify a set of modulated symbols of the first p-CW that is mapped to the second set of layers based on the indication 710 of the CW mapping. Moreover, 804 may be performed by the component 198 of the apparatus 1504 in FIG. 15.

At 806, the UE may perform a decoding process for at least one of the first c-CW or the first p-CW based on at least one of the first set of modulated symbols or the second set of modulated symbols. For example, 806 may be performed by the UE 702 in FIG. 7, which may, at 718, perform a decoding process for the either the first c-CW, the first p-CW, or both the first c-CW and the first p-CW based on at least one of the first set of modulated symbols or the second set of modulated symbols. In some aspects, where the common message may include a portion of a message for a different UE than the UE 702, the UE 702 may perform the decoding process for the first p-CW but not perform the decoding process for the first c-CW. Moreover, 806 may be performed by the component 198 of the apparatus 1504 in FIG. 15. the component 198 of the apparatus 1504 in FIG. 15.

Figure 9:
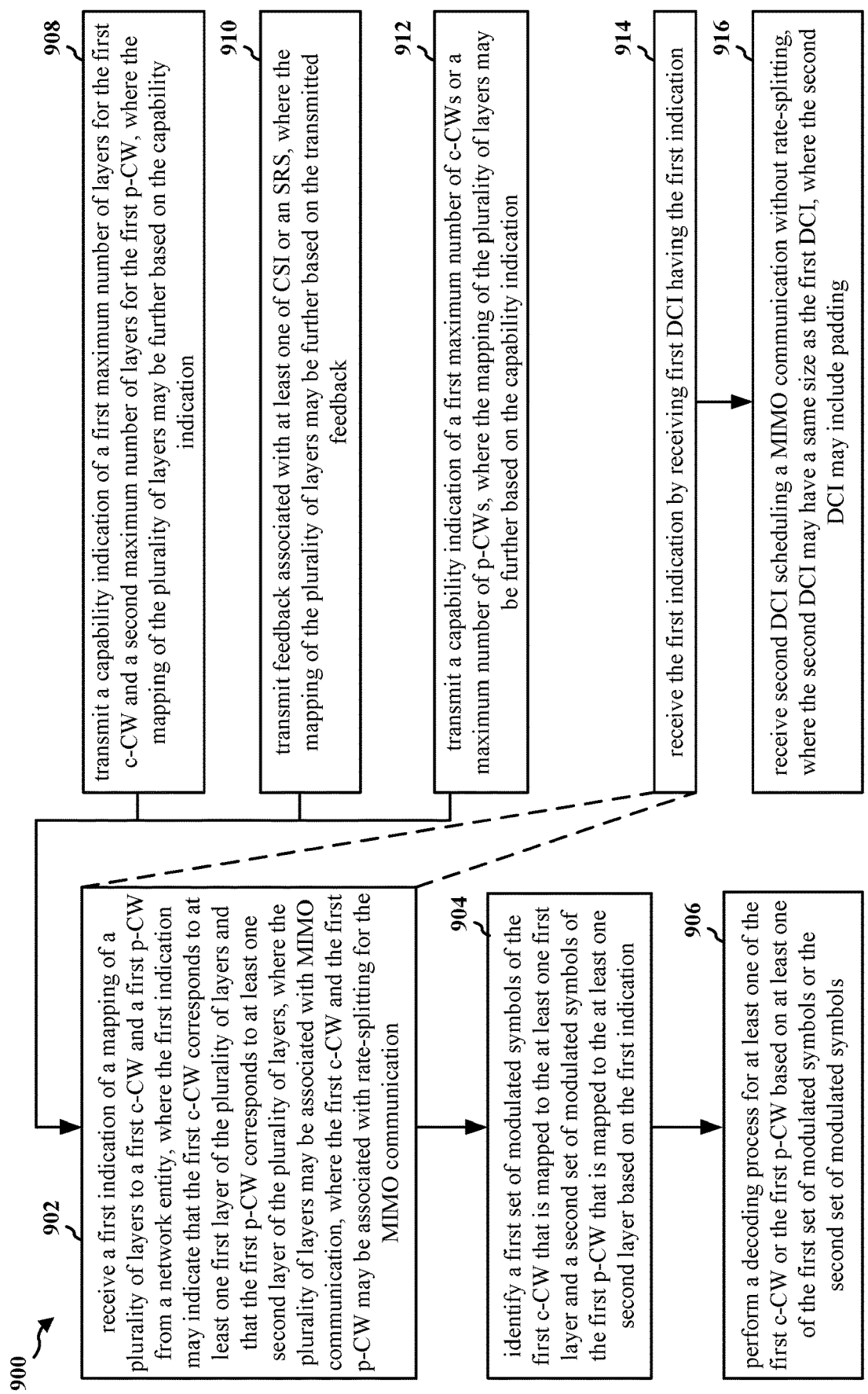
FIG. 9 is another flowchart of a method of wireless communication.

FIG. 9 is a flowchart 900 of a method of wireless communication. The method may be performed by a UE (e.g., the UE 104, the UE 350, the UE 702; the apparatus 1504). At 902, the UE may receive a first indication of a mapping of a plurality of layers to a first c-CW and a first p-CW from a network entity. The first indication may indicate that the first c-CW corresponds to at least one first layer of the plurality of layers. The first indication may additionally or alternatively indicate that the first p-CW corresponds to at least one second layer of the plurality of layers. The plurality of layers may be associated with MIMO communication. The first c-CW and the first p-CW CW may be associated with rate-splitting for the MIMO communication. For example, 902 may be performed by the UE 702 in FIG. 7, which may receive an indication 710 of the CW mapping of a plurality of layers to a first c-CW and a first p-CW from a network entity, such as a first set of layers to a first c-CW and a second set of layers to a first p-CW. The indication 710 of the CW mapping may indicate that the first c-CW corresponds to the first set of layers of the plurality of layers. The indication 710 of the CW mapping may additionally or alternatively indicate that the first p-CW corresponds to the second set of layers of the plurality of layers. The first and second set of layers may be different from one another. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 902 may be performed by the component 198 of the apparatus 1504 in FIG. 15.

At 904, the UE may identify a first set of modulated symbols of the first c-CW that is mapped to the at least one first layer and a second set of modulated symbols of the first p-CW that is mapped to the at least one second layer based on the first indication. For example, 904 may be performed by the UE 702 in FIG. 7, which, at 712, may identify a set of modulated symbols of the first c-CW that is mapped to the first set of layers based on the indication 710 of the CW mapping. At 712, the UE 702 may alternatively or additionally identify a set of modulated symbols of the first p-CW that is mapped to the second set of layers based on the indication 710 of the CW mapping. Moreover, 904 may be performed by the component 198 of the apparatus 1504 in FIG. 15.

At 906, the UE may perform a decoding process for at least one of the first c-CW or the first p-CW based on at least one of the first set of modulated symbols or the second set of modulated symbols. For example, 906 may be performed by the UE 702 in FIG. 7, which may, at 718, perform a decoding process for the either the first c-CW, the first p-CW, or both the first c-CW and the first p-CW based on at least one of the first set of modulated symbols or the second set of modulated symbols. In some aspects, where the common message may include a portion of a message for a different UE than the UE 702, the UE 702 may perform the decoding process for the first p-CW but not perform the decoding process for the first c-CW. Moreover, 906 may be performed by the component 198 of the apparatus 1504 in FIG. 15. the component 198 of the apparatus 1504 in FIG. 15.

At 908, the UE may transmit a capability indication of a first maximum number of layers for the first c-CW and a second maximum number of layers for the first p-CW. The mapping of the plurality of layers may be further based on the capability indication. For example, 908 may be performed by the UE 702 in FIG. 7, which may transmit UE capability/feedback 706 to the network entity 704. The UE capability/feedback 706 may indicate a maximum number of layers for the first c-CW. The UE capability/feedback 706 may additionally or alternatively indicate a maximum number of layers for the first p-CW. The mapping of the plurality of layers may be further based on the capability indication. For example, the capability indication may limit the maximum number of layers for the first c-CW and/or the maximum number of layers for the first p-CW, influencing how many layers may be mapped to each by the network entity 704 at 708. Moreover, 908 may be performed by the component 198 of the apparatus 1504 in FIG. 15.

At 910, the UE may transmit feedback associated with at least one of CSI or an SRS. The mapping of the plurality of layers may be further based on the transmitted feedback. For example, 910 may be performed by the UE 702 in FIG. 7, which may transmit the UE capability/feedback 706 to the network entity 704. The UE capability/feedback 706 may be associated with at least one of CSI or an SRS. The CSI or the SRS may have been output by the network entity 704. The CSI or the SRS may have been processed (e.g., measured), by the UE 702. The mapping of the plurality of layers may be further based on the UE capability/feedback 706 transmitted from the UE 702 to the network entity 704. For example, the network entity 704 may optimize layer selection based on feedback from a CSI and/or an SRS measurement. Moreover, 910 may be performed by the component 198 of the apparatus 1504 in FIG. 15.

At 912, the UE may transmit a capability indication of a first maximum number of c-CWs or a maximum number of p-CWs, where the mapping of the plurality of layers may be further based on the capability indication. For example, 912 may be performed by the component 198 of the apparatus 1504 in FIG. 15.

At 914, the UE may receive the first indication by receiving first DCI having the first indication. For example, 914 may be performed by the UE 702 in FIG. 7, which may receive the indication 710 of CW mapping as DCI that schedules the rate-split MIMO transmission 716. The DCI may have the indication 710 of CW mapping, such as an index. Moreover, 914 may be performed by the component 198 of the apparatus 1504 in FIG. 15.

At 916, the UE may receive second DCI scheduling a MIMO communication without rate-splitting. The second DCI may have a same size as the first DCI. The second DCI may include padding. For example, 916 may be performed by the UE 702 in FIG. 7, which may receive non-rate splitting DCI 720 from the network entity 704. The non-rate splitting DCI 720 may schedule a MIMO communication without rate-splitting for the UE 702. The non-rate splitting DCI 720 may have a same size as the DCI of the indication 710 of the CW mapping. The non-rate splitting DCI 720 may include padding. For example, the non-rate splitting DCI 720 may have zero padding in a field where the DCI of the indication 710 of the CW mapping has an index to a table indicating the layer mapping of a set of p-CWs and a set of c-CWs. Moreover, 916 may be performed by the component 198 of the apparatus 1504 in FIG. 15.

Figure 10:
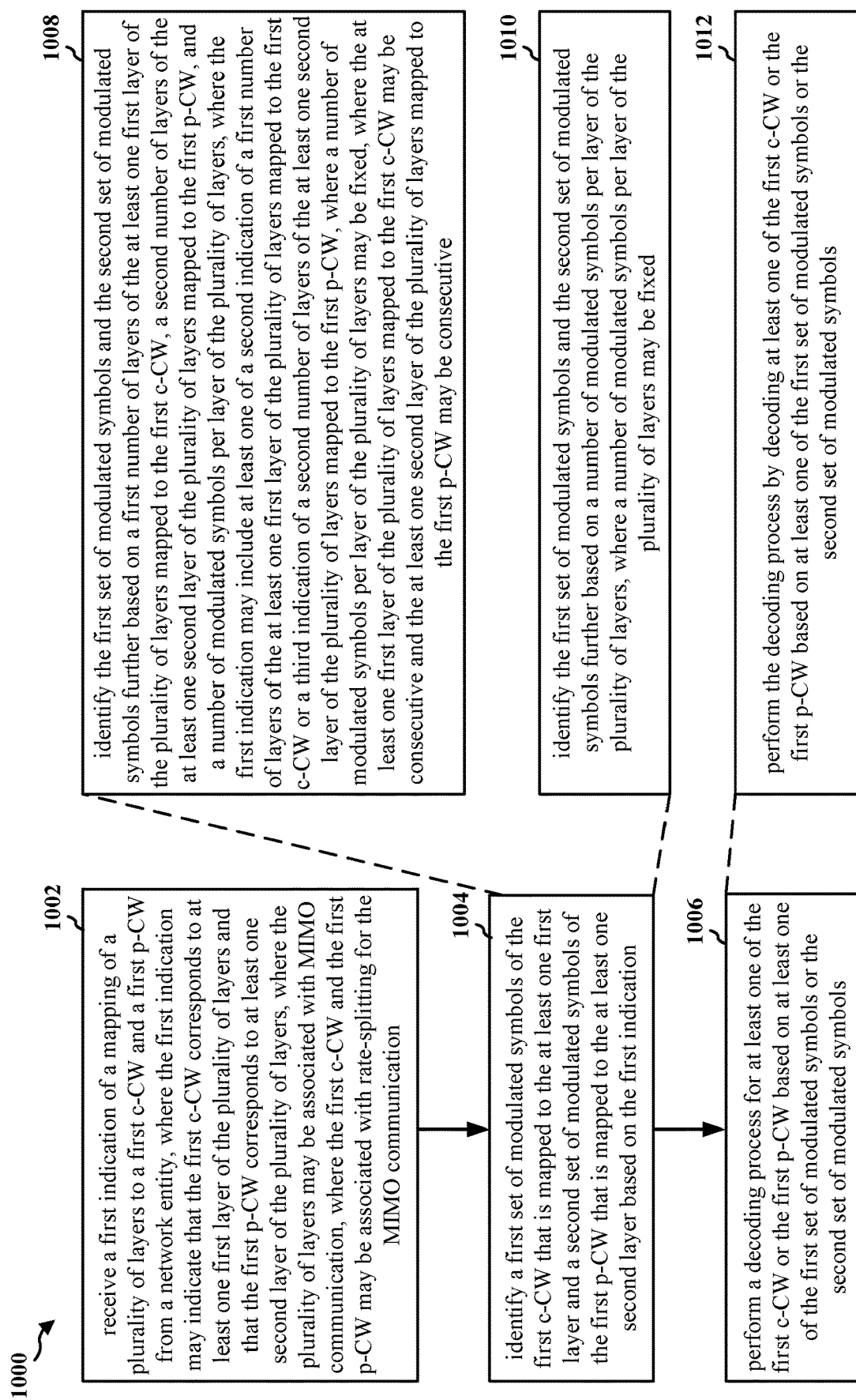
FIG. 10 is another flowchart of a method of wireless communication.

FIG. 10 is a flowchart 1000 of a method of wireless communication. The method may be performed by a UE (e.g., the UE 104, the UE 350, the UE 702; the apparatus 1504). At 1002, the UE may receive a first indication of a mapping of a plurality of layers to a first c-CW and a first p-CW from a network entity. The first indication may indicate that the first c-CW corresponds to at least one first layer of the plurality of layers. The first indication may additionally or alternatively indicate that the first p-CW corresponds to at least one second layer of the plurality of layers. The plurality of layers may be associated with MIMO communication. The first c-CW and the first p-CW may be associated with rate-splitting for the MIMO communication. For example, 1002 may be performed by the UE 702 in FIG. 7, which may receive an indication 710 of the CW mapping of a plurality of layers to a first c-CW and a first p-CW from a network entity, such as a first set of layers to a first c-CW and a second set of layers to a first p-CW. The indication 710 of the CW mapping may indicate that the first c-CW corresponds to the first set of layers of the plurality of layers. The indication 710 of the CW mapping may additionally or alternatively indicate that the first p-CW corresponds to the second set of layers of the plurality of layers. The first and second set of layers may be different from one another. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 1002 may be performed by the component 198 of the apparatus 1504 in FIG. 15.

At 1004, the UE may identify a first set of modulated symbols of the first c-CW that is mapped to the at least one first layer and a second set of modulated symbols of the first p-CW that is mapped to the at least one second layer based on the first indication. For example, 1004 may be performed by the UE 702 in FIG. 7, which, at 712, may identify a set of modulated symbols of the first c-CW that is mapped to the first set of layers based on the indication 710 of the CW mapping. At 712, the UE 702 may alternatively or additionally identify a set of modulated symbols of the first p-CW that is mapped to the second set of layers based on the indication 710 of the CW mapping. Moreover, 1004 may be performed by the component 198 of the apparatus 1504 in FIG. 15.

At 1006, the UE may perform a decoding process for at least one of the first c-CW or the first p-CW based on at least one of the first set of modulated symbols or the second set of modulated symbols. For example, 1006 may be performed by the UE 702 in FIG. 7, which may, at 718, perform a decoding process for the either the first c-CW, the first p-CW, or both the first c-CW and the first p-CW based on at least one of the first set of modulated symbols or the second set of modulated symbols. In some aspects, where the common message may include a portion of a message for a different UE than the UE 702, the UE 702 may perform the decoding process for the first p-CW but not perform the decoding process for the first c-CW. Moreover, 1006 may be performed by the component 198 of the apparatus 1504 in FIG. 15. the component 198 of the apparatus 1504 in FIG. 15.

At 1008, the UE may identify the first set of modulated symbols and the second set of modulated symbols further based on a first number of layers of the at least one first layer of the plurality of layers mapped to the first c-CW, a second number of layers of the at least one second layer of the plurality of layers mapped to the first p-CW, and a number of modulated symbols per layer of the plurality of layers. The first indication may include at least one of a second indication of a first number of layers of the at least one first layer of the plurality of layers mapped to the first c-CW or a third indication of a second number of layers of the at least one second layer of the plurality of layers mapped to the first p-CW. A number of modulated symbols per layer of the plurality of layers may be fixed. The at least one first layer of the plurality of layers mapped to the first c-CW may be consecutive. The at least one second layer of the plurality of layers mapped to the first p-CW may be consecutive. For example, 1008 may be performed by the UE 702 in FIG. 7, which, at 712, may identify the first set of modulated symbols and the second set of modulated symbols further based on a first number of layers of the at least one first layer of the plurality of layers mapped to the first c-CW, a second number of layers of the at least one second layer of the plurality of layers mapped to the first p-CW, and a number of modulated symbols per layer of the plurality of layers. For example, the first set of modulated symbols may be identified by the number of modulated symbols per layer of the plurality of layers multiplied by the first number of layers and the second set of modulated symbols may be identified by the number of modulated symbols per layer of the plurality of layers multiplied by the second number of layers. The symbols for the c-CW may be placed before the symbols for the p-CW, or vice-versa. The indication 710 of the CW mapping may indicate the first number, or the second number, or the first and second number, for example via an index to an RRC configured table. The number of modulated symbols per layer of the plurality of layers may be fixed. For example, the value for $M_{symb}^{layer}$ may be defined by RRC, DCI, or MAC-CE by the network entity 704. One or both of the layers may be consecutive, allowing the UE 702 to identify the symbols by analyzing at contiguous sets of data of the common message. For example, where the p-CW is has three layers, the c-CW has two layers, the $M_{symb}^{layer}$ is defined to be ten, and the mapping to the p-CW is performed to the first set of layers and the mapping to the c-CW is performed on the remaining layers, the UE 702 may determine that the thirty modulated symbols of the p-CW are mapped to the first three layers and the next twenty modulated symbols of the c-CW are mapped to the next two layers. Moreover, 1008 may be performed by the component 198 of the apparatus 1504 in FIG. 15. the component 198 of the apparatus 1504 in FIG. 15.

At 1010, the UE may identify the first set of modulated symbols and the second set of modulated symbols further based on a number of modulated symbols per layer of the plurality of layers. A number of modulated symbols per layer of the plurality of layers may be fixed. For example, 1010 may be performed by the UE 702 in FIG. 7, which, at 712, may identify the first set of modulated symbols and the second set of modulated symbols further based on a number of modulated symbols per layer of the plurality of layers without additional information from the indication 710 of CW mapping. The number of layers for the p-CW or the c-CW may be determined by the UE 702 in other ways. For example, the number of layers for the p-CW may be fixed at one, the number of layers for the c-CW may be fixed at one, or the number of layers for the p-CW and the c-CW may be evenly divided by the total number of layers. The number of modulated symbols per layer of the plurality of layers may be fixed. For example, the value for $M_{symb}^{layer}$ may be defined by RRC, DCI, or MAC-CE by the network entity 704. Moreover, 1010 may be performed by the component 198 of the apparatus 1504 in FIG. 15. the component 198 of the apparatus 1504 in FIG. 15.

At 1012, the UE may perform the decoding process by decoding at least one of the first c-CW or the first p-CW based on at least one of the first set of modulated symbols or the second set of modulated symbols. For example, 1012 may be performed by the UE 702 in FIG. 7, which may perform the decoding process at 718 by decoding at least one of the first c-CW or the first p-CW based on at least one of the first set of modulated symbols or the second set of modulated symbols. Moreover, 1012 may be performed by the component 198 of the apparatus 1504 in FIG. 15. the component 198 of the apparatus 1504 in FIG. 15.

Figure 11:
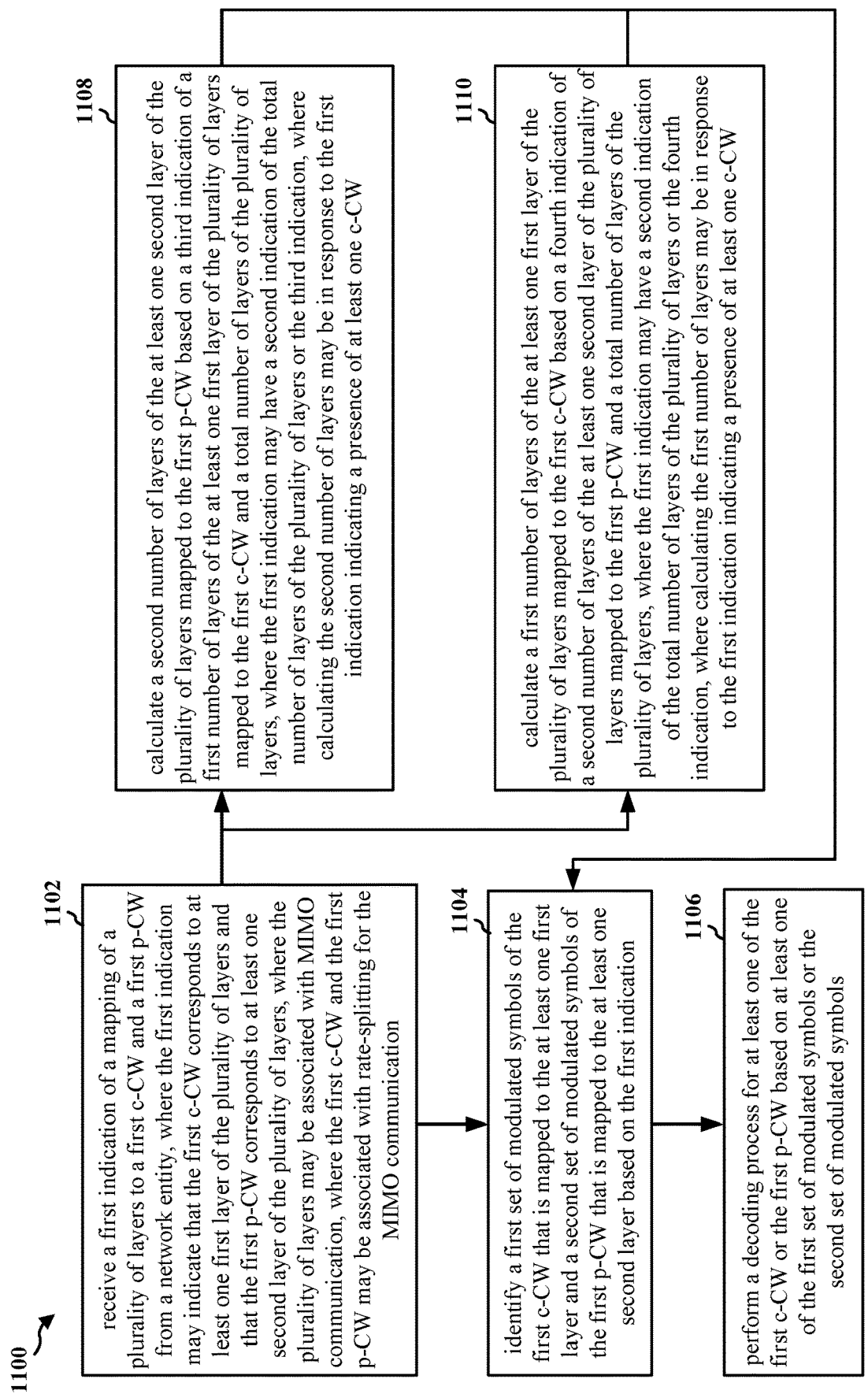
FIG. 11 is another flowchart of a method of wireless communication.

FIG. 11 is a flowchart 1100 of a method of wireless communication. The method may be performed by a UE (e.g., the UE 104, the UE 350, the UE 702; the apparatus 1504). At 1102, the UE may receive a first indication of a mapping of a plurality of layers to a first c-CW and a first p-CW from a network entity. The first indication may indicate that the first c-CW corresponds to at least one first layer of the plurality of layers. The first indication may additionally or alternatively indicate that the first p-CW corresponds to at least one second layer of the plurality of layers. The plurality of layers may be associated with MIMO communication. The first c-CW and the first p-CW may be associated with rate-splitting for the MIMO communication. For example, 1102 may be performed by the UE 702 in FIG. 7, which may receive an indication 710 of the CW mapping of a plurality of layers to a first c-CW and a first p-CW from a network entity, such as a first set of layers to a first c-CW and a second set of layers to a first p-CW. The indication 710 of the CW mapping may indicate that the first c-CW corresponds to the first set of layers of the plurality of layers. The indication 710 of the CW mapping may additionally or alternatively indicate that the first p-CW corresponds to the second set of layers of the plurality of layers. The first and second set of layers may be different from one another. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 1102 may be performed by the component 198 of the apparatus 1504 in FIG. 15.

At 1104, the UE may identify a first set of modulated symbols of the first c-CW that is mapped to the at least one first layer and a second set of modulated symbols of the first p-CW that is mapped to the at least one second layer based on the first indication. For example, 1104 may be performed by the UE 702 in FIG. 7, which, at 712, may identify a set of modulated symbols of the first c-CW that is mapped to the first set of layers based on the indication 710 of the CW mapping. At 712, the UE 702 may alternatively or additionally identify a set of modulated symbols of the first p-CW that is mapped to the second set of layers based on the indication 710 of the CW mapping. Moreover, 1104 may be performed by the component 198 of the apparatus 1504 in FIG. 15.

At 1106, the UE may perform a decoding process for at least one of the first c-CW or the first p-CW based on at least one of the first set of modulated symbols or the second set of modulated symbols. For example, 1106 may be performed by the UE 702 in FIG. 7, which may, at 718, perform a decoding process for the either the first c-CW, the first p-CW, or both the first c-CW and the first p-CW based on at least one of the first set of modulated symbols or the second set of modulated symbols. In some aspects, where the common message may include a portion of a message for a different UE than the UE 702, the UE 702 may perform the decoding process for the first p-CW but not perform the decoding process for the first c-CW. Moreover, 1106 may be performed by the component 198 of the apparatus 1504 in FIG. 15. the component 198 of the apparatus 1504 in FIG. 15.

At 1108, the UE may calculate a second number of layers of the at least one second layer of the plurality of layers mapped to the first p-CW based on a third indication of a first number of layers of the at least one first layer of the plurality of layers mapped to the first c-CW and a total number of layers of the plurality of layers. The first indication may have a second indication of the total number of layers of the plurality of layers or the third indication. Calculating the second number of layers may be in response to the first indication indicating a presence of at least one c-CW. For example, 1108 may be performed by the UE 702 in FIG. 7, which may calculate a number of layers mapped to the first p-CW by subtracting the number of layers mapped to the first c-CW from the total number of layers. The indication 710 of the CW mapping may indicate the total number of layers and/or the number of layers mapped to the first c-CW. The calculation may be triggered by the UE 702 receiving an indication that there is at least one p-CW. Moreover, 1108 may be performed by the component 198 of the apparatus 1504 in FIG. 15. the component 198 of the apparatus 1504 in FIG. 15.

At 1110, the UE may calculate a first number of layers of the at least one first layer of the plurality of layers mapped to the first c-CW based on a fourth indication of a second number of layers of the at least one second layer of the plurality of layers mapped to the first p-CW and a total number of layers of the plurality of layers. The first indication may have a second indication of the total number of layers of the plurality of layers or the fourth indication. Calculating the first number of layers may be in response to the first indication indicating a presence of at least one c-CW. For example, 1110 may be performed by the UE 702 in FIG. 7, which may calculate a number of layers mapped to the first c-CW by subtracting the number of layers mapped to the first p-CW from the total number of layers. The indication 710 of the CW mapping may indicate the total number of layers and/or the number of layers mapped to the first p-CW. The calculation may be triggered by the UE 702 receiving an indication that there is at least one c-CW. Moreover, 1110 may be performed by the component 198 of the apparatus 1504 in FIG. 15. the component 198 of the apparatus 1504 in FIG. 15.

Figure 12:
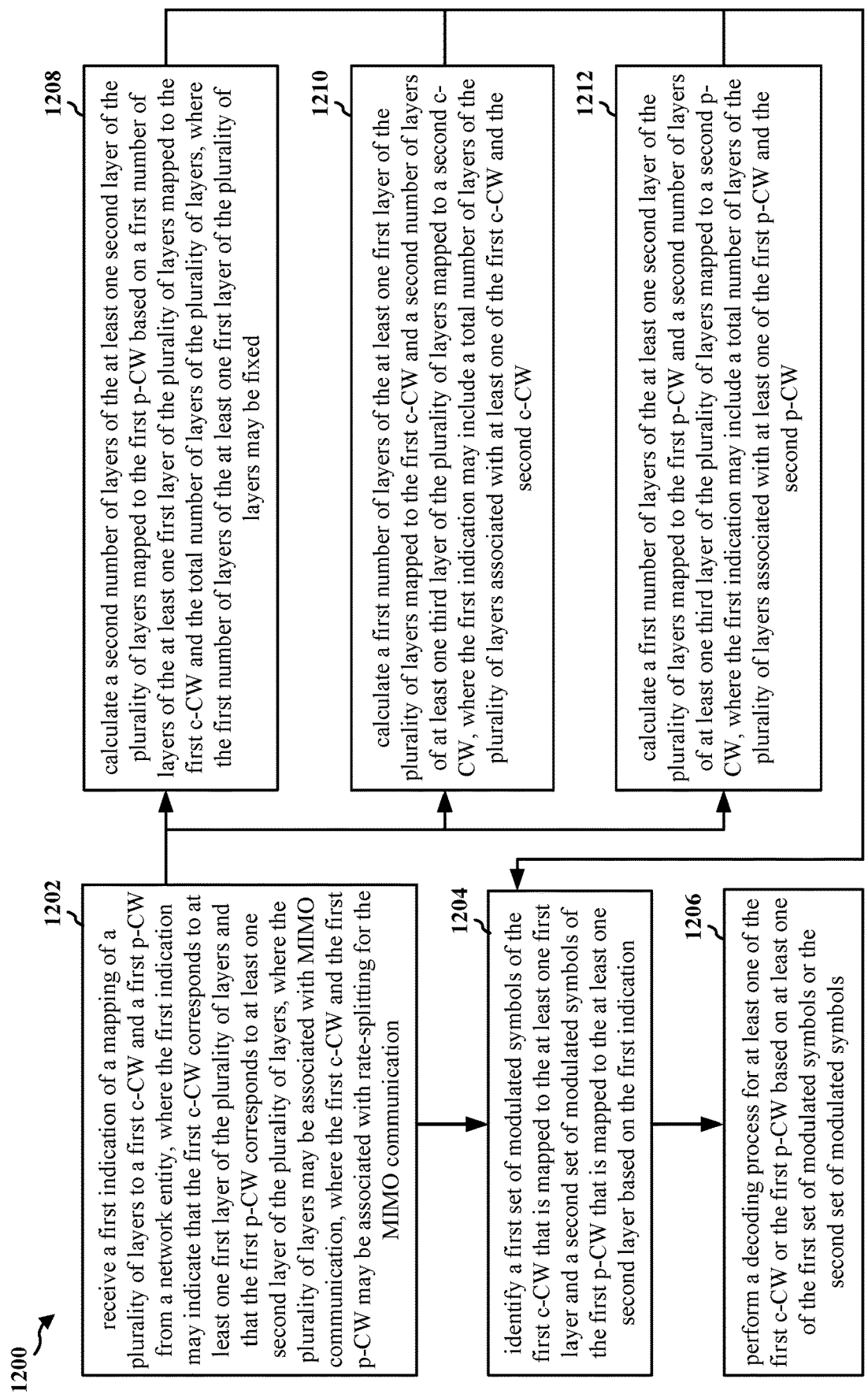
FIG. 12 is another flowchart of a method of wireless communication.

FIG. 12 is a flowchart 1200 of a method of wireless communication. The method may be performed by a UE (e.g., the UE 104, the UE 350, the UE 702; the apparatus 1504). At 1202, the UE may receive a first indication of a mapping of a plurality of layers to a first c-CW and a first p-CW from a network entity. The first indication may indicate that the first c-CW corresponds to at least one first layer of the plurality of layers. The first indication may additionally or alternatively indicate that the first p-CW corresponds to at least one second layer of the plurality of layers. The plurality of layers may be associated with MIMO communication. The first c-CW and the first p-CW may be associated with rate-splitting for the MIMO communication. For example, 1202 may be performed by the UE 702 in FIG. 7, which may receive an indication 710 of the CW mapping of a plurality of layers to a first c-CW and a first p-CW from a network entity, such as a first set of layers to a first c-CW and a second set of layers to a first p-CW. The indication 710 of the CW mapping may indicate that the first c-CW corresponds to the first set of layers of the plurality of layers. The indication 710 of the CW mapping may additionally or alternatively indicate that the first p-CW corresponds to the second set of layers of the plurality of layers. The first and second set of layers may be different from one another. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 1202 may be performed by the component 198 of the apparatus 1504 in FIG. 15.

At 1204, the UE may identify a first set of modulated symbols of the first c-CW that is mapped to the at least one first layer and a second set of modulated symbols of the first p-CW that is mapped to the at least one second layer based on the first indication. For example, 1204 may be performed by the UE 702 in FIG. 7, which, at 712, may identify a set of modulated symbols of the first c-CW that is mapped to the first set of layers based on the indication 710 of the CW mapping. At 712, the UE 702 may alternatively or additionally identify a set of modulated symbols of the first p-CW that is mapped to the second set of layers based on the indication 710 of the CW mapping. Moreover, 1204 may be performed by the component 198 of the apparatus 1504 in FIG. 15.

At 1206, the UE may perform a decoding process for at least one of the first c-CW or the first p-CW based on at least one of the first set of modulated symbols or the second set of modulated symbols. For example, 1206 may be performed by the UE 702 in FIG. 7, which may, at 718, perform a decoding process for the either the first c-CW, the first p-CW, or both the first c-CW and the first p-CW based on at least one of the first set of modulated symbols or the second set of modulated symbols. In some aspects, where the common message may include a portion of a message for a different UE than the UE 702, the UE 702 may perform the decoding process for the first p-CW but not perform the decoding process for the first c-CW. Moreover, 1206 may be performed by the component 198 of the apparatus 1504 in FIG. 15. the component 198 of the apparatus 1504 in FIG. 15.

At 1208, the UE may calculate a second number of layers of the at least one second layer of the plurality of layers mapped to the first p-CW based on a first number of layers of the at least one first layer of the plurality of layers mapped to the first c-CW and the total number of layers of the plurality of layers. The first number of layers of the at least one first layer of the plurality of layers may be fixed. For example, 1208 may be performed by the UE 702 in FIG. 7, which may calculate a number of layers mapped to the first p-CW based on the number of layers mapped to the first c-CW and the total number of layers. The indication 710 of the CW mapping may indicate the total number of layers. The number of layers mapped to the first c-CW may be fixed, for example at two or one. The UE 702 may subtract the fixed number of layers mapped to the first c-CW from the received total number of layers to determine the number of layers mapped to the first p-CW. Moreover, 1208 may be performed by the component 198 of the apparatus 1504 in FIG. 15. the component 198 of the apparatus 1504 in FIG. 15.

At 1210, the UE may calculate a first number of layers of the at least one first layer of the plurality of layers mapped to the first c-CW and a second number of layers of at least one third layer of the plurality of layers mapped to a second c-CW. The first indication may include a total number of layers of the plurality of layers associated with at least one of the first c-CW and the second c-CW. For example, 1210 may be performed by the UE 702 in FIG. 7, which may calculate a number of layers mapped to the first c-CW based on the number of layers mapped to the first p-CW and the total number of layers. The indication 710 of the CW mapping may indicate the total number of layers. The number of layers mapped to the first p-CW may be fixed, for example at two or one. The UE 702 may subtract the fixed number of layers mapped to the first p-CW from the received total number of layers to determine the number of layers mapped to the first c-CW. Moreover, 1210 may be performed by the component 198 of the apparatus 1504 in FIG. 15. the component 198 of the apparatus 1504 in FIG. 15.

At 1212, the UE may calculate a first number of layers of the at least one second layer of the plurality of layers mapped to the first p-CW and a second number of layers of at least one third layer of the plurality of layers mapped to a second p-CW. The first indication may include a total number of layers of the plurality of layers associated with at least one of the first p-CW and the second p-CW. For example, 1212 may be performed by the UE 702 in FIG. 7, which may calculate a number of layers mapped to the first p-CW and a number of layers mapped to the second p-CW based on the total number of layers mapped to any p-CW. The indication 710 of the CW mapping may indicate the total number of layers mapped to any p-CW. The number of layers mapped to the first p-CW and the second p-CW may be at a fixed ratio, for example each may have half of the total number of layers (one may be rounded up and the other down if odd). Moreover, 1212 may be performed by the component 198 of the apparatus 1504 in FIG. 15. the component 198 of the apparatus 1504 in FIG. 15.

Figure 13:
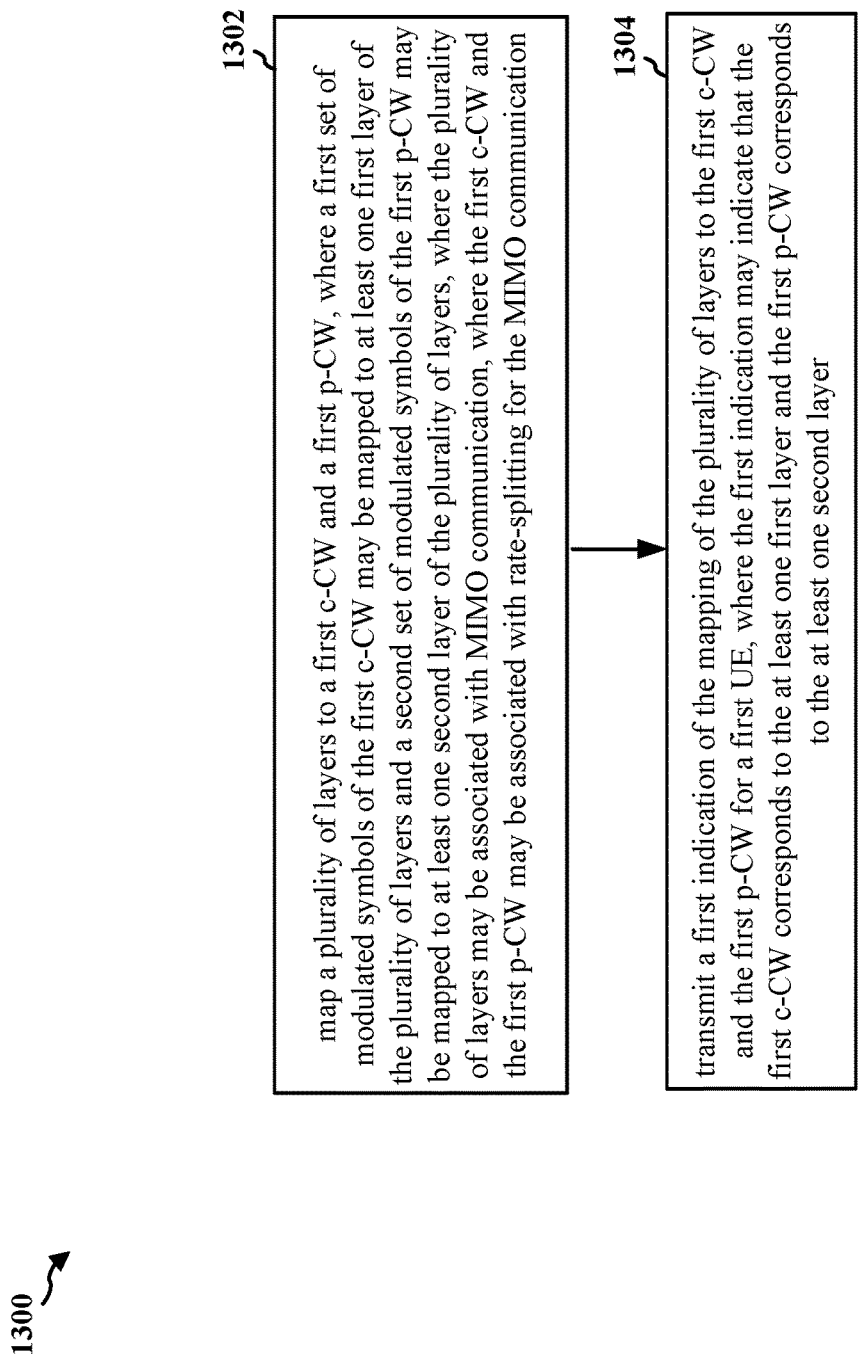
FIG. 13 is another flowchart of a method of wireless communication.

FIG. 13 is a flowchart 1300 of a method of wireless communication. The method may be performed by a base station (e.g., the base station 102, base station 310; the network entity 704, the network entity 1502). At 1302, the network entity may map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. For example, 1302 may performed by the network entity 704 in FIG. 7, which may, at 708, map a plurality of layers to a first c-CW and a first p-CW. The network entity 704 may map a set of modulated symbols of the first c-CW to a first set of layers of the plurality of layers. The network entity 704 may map a set of modulated symbols of the first p-CW to a second set of layers of the plurality of layers. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 1302 may be performed by the component 199 of the network entity 1602 in FIG. 16.

At 1304, the network entity may transmit a first indication of the mapping of the plurality of layers to the first c-CW and the first p-CW for a first UE. The first indication may indicate that the first c-CW corresponds to the at least one first layer and the first p-CW corresponds to the at least one second layer. For example, 1304 may performed by the network entity 704 in FIG. 7, which may transmit the indication 710 of the CW mapping of the first c-CW and the first p-CW for the UE 702. The indication 710 of the CW mapping may indicate that the first c-CW corresponds to the first set of layers and the first p-CW corresponds to the second set of layers. Moreover, 1302 may be performed by the component 199 of the network entity 1602 in FIG. 16.

Figure 14:
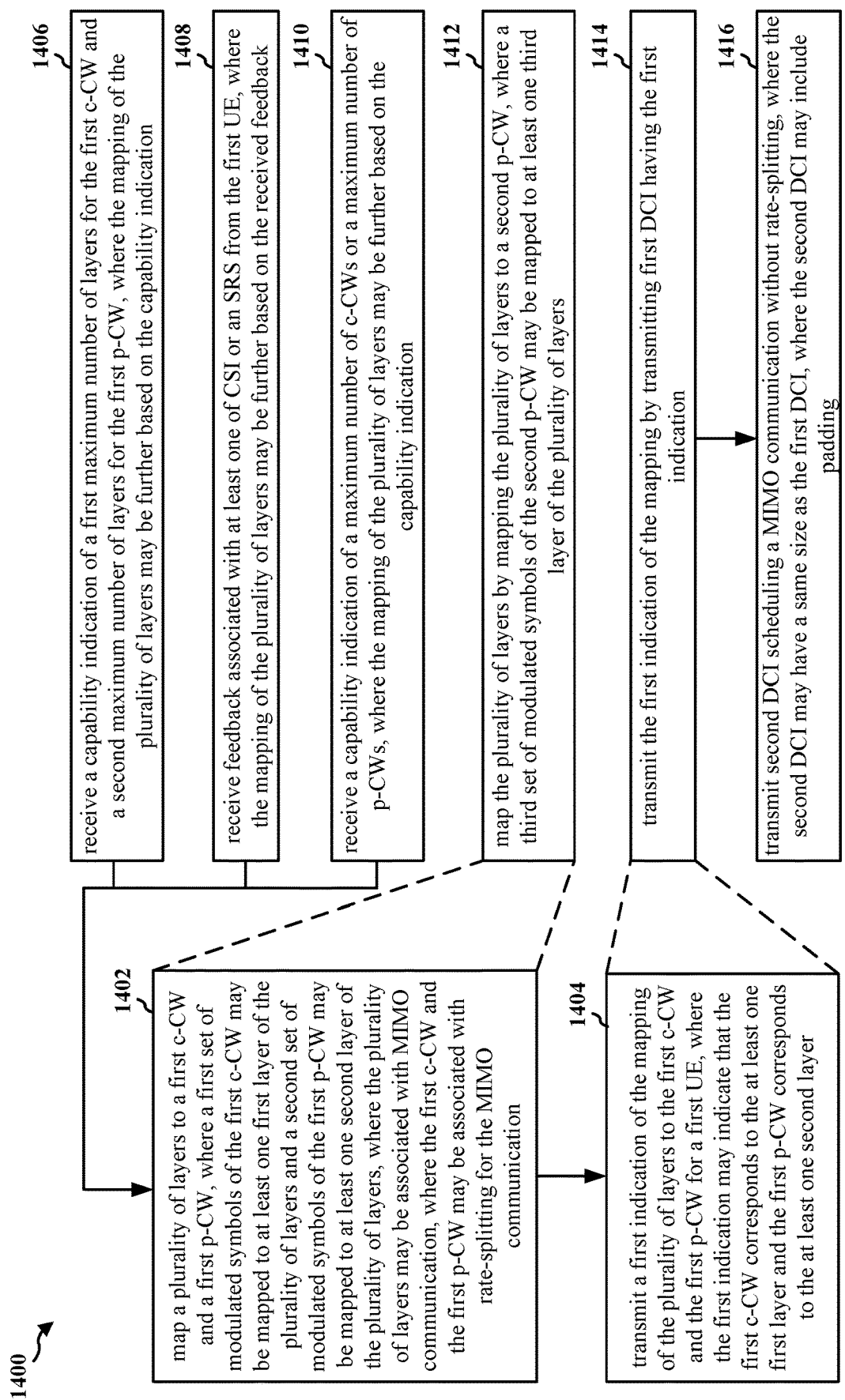
FIG. 14 is another flowchart of a method of wireless communication.

FIG. 14 is a flowchart 1400 of a method of wireless communication. The method may be performed by a base station (e.g., the base station 102, base station 310; the network entity 704, the network entity 1502). At 1402, the network entity may map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. For example, 1402 may performed by the network entity 704 in FIG. 7, which may, at 708, map a plurality of layers to a first c-CW and a first p-CW. The network entity 704 may map a set of modulated symbols of the first c-CW to a first set of layers of the plurality of layers. The network entity 704 may map a set of modulated symbols of the first p-CW to a second set of layers of the plurality of layers. The plurality of layers may be associated with MIMO communication, such as the rate-split MIMO transmission 716. The first c-CW and the first p-CW may be associated with rate-splitting for the MIMO communication, such as the rate-split MIMO transmission 716. Moreover, 1402 may be performed by the component 199 of the network entity 1602 in FIG. 16.

At 1404, the network entity may transmit a first indication of the mapping of the plurality of layers to the first c-CW and the first p-CW for a first UE. The first indication may indicate that the first c-CW corresponds to the at least one first layer and the first p-CW corresponds to the at least one second layer. For example, 1404 may performed by the network entity 704 in FIG. 7, which may transmit the indication 710 of the CW mapping of the first c-CW and the first p-CW for the UE 702. The indication 710 of the CW mapping may indicate that the first c-CW corresponds to the first set of layers and the first p-CW corresponds to the second set of layers. Moreover, 1404 may be performed by the component 199 of the network entity 1602 in FIG. 16.

At 1406, the network entity may receive a capability indication of a first maximum number of layers for the first c-CW and a second maximum number of layers for the first p-CW, where the mapping of the plurality of layers may be further based on the capability indication. For example, 1406 may be performed by the network Moreover, 1406 may be performed by the component 199 of the network entity 1602 in FIG. 16.

At 1408, the network entity may receive feedback associated with at least one of CSI or an SRS from the first UE, where the mapping of the plurality of layers may be further based on the received feedback. For example, 1408 may be performed by the Moreover, 1408 may be performed by the component 199 of the network entity 1602 in FIG. 16.

At 1410, the network entity may receive a capability indication of a maximum number of c-CWs or a maximum number of p-CWs. The mapping of the plurality of layers may be further based on the capability indication. For example, 1410 may be performed by the network entity 704 in FIG. 7, which may receive the UE capability/feedback 706 from the UE 702. The UE capability/feedback 706 may have an indication of a maximum number of c-CWs (e.g., $c\text{-}CW^{max}$) or a maximum number of p-CWs (e.g., $p\text{-}CW^{max}$). The mapping of the plurality of layers at 708 may be further based on the UE capability/feedback 706 indicating the maximum number of c-CWs or the maximum number of p-CWs. Moreover, 1410 may be performed by the component 199 of the network entity 1602 in FIG. 16.

At 1412, the network entity may map the plurality of layers by mapping the plurality of layers to a second p-CW. A third set of modulated symbols of the second p-CW may be mapped to at least one third layer of the plurality of layers. For example, 1412 may be performed by the network entity 704 in FIG. 7, which, at 708, may map the plurality of layers by mapping the plurality of layers to a second p-CW in addition to the first p-CW. A third set of modulated symbols of the second p-CW may be mapped to a third set of layers of the plurality of layers. Moreover, 1412 may be performed by the component 199 of the network entity 1602 in FIG. 16.

At 1414, the network entity may transmit the first indication of the mapping by transmitting first DCI having the first indication. For example, 1414 may be performed by the network entity 704 in FIG. 7, which may transmit the indication 710 of the CW mapping via DCI that schedules the rate-split MIMO transmission 716. The DCI may have the indication 710 of the CW mapping in one or more fields, such as an index to a mapping table. Moreover, 1414 may be performed by the component 199 of the network entity 1602 in FIG. 16.

At 1416, the network entity may transmit second DCI scheduling a MIMO communication without rate-splitting. The second DCI may have a same size as the first DCI, where the second DCI may include padding. For example, 1416 may be performed by the network entity 704 in FIG. 7, which may transmit non-rate splitting DCI 720 to the UE 702. The non-rate splitting DCI 720 may schedule a MIMO communication without rate-splitting. The non-rate splitting DCI 720 may have a same size as the DCI of the indication 710 of the CW mapping. The non-rate splitting DCI 720 may include padding. For example, the non-rate splitting DCI 720 may have zero padding in a field where the DCI of the indication 710 of the CW mapping has an index to a table indicating the layer mapping of a set of p-CWs and a set of c-CWs. Moreover, 1416 may be performed by the component 199 of the network entity 1602 in FIG. 16.

Figure 15:
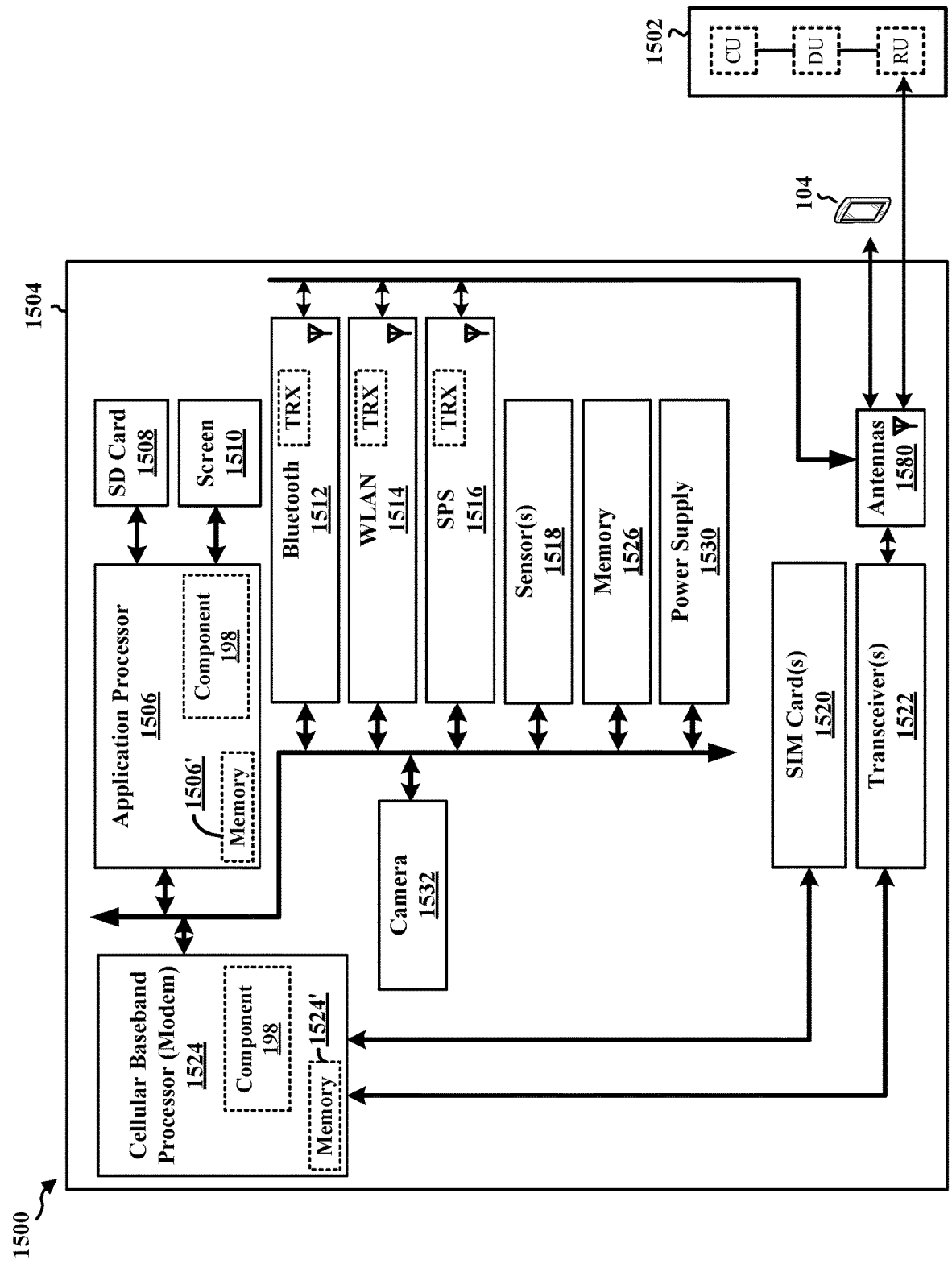
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRx) (or in some cases, just a receiver (Rx)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the Tx processor 368, the Rx processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 may be configured to receive a first indication of a mapping of a plurality of layers to a first c-CW and a first p-CW from a network entity. The first indication may indicate that the first c-CW corresponds to at least one first layer of the plurality of layers and that the first p-CW corresponds to at least one second layer of the plurality of layers. The plurality of layers may be associated with MIMO communication. The first c-CW and the first p-CW may be associated with rate-splitting for the MIMO communication. The component 198 may be configured to identify a first set of modulated symbols of the first c-CW that is mapped to the at least one first layer and a second set of modulated symbols of the first p-CW that is mapped to the at least one second layer based on the first indication. The component 198 may be configured to perform a decoding process for at least one of the first c-CW or the first p-CW based on at least one of the first set of modulated symbols or the second set of modulated symbols. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving a first indication of a mapping of a plurality of layers to a first c-CW and a first p-CW from a network entity. The apparatus 1504 may include means for identifying a first set of modulated symbols of the first c-CW that is mapped to the at least one first layer and a second set of modulated symbols of the first p-CW that is mapped to the at least one second layer based on the first indication. The apparatus 1504 may include means for performing a decoding process for at least one of the first c-CW or the first p-CW based on at least one of the first set of modulated symbols or the second set of modulated symbols. The apparatus 1504 may include means for receiving second DCI having a MIMO communication without rate-splitting. The apparatus 1504 may include means for identifying the first set of modulated symbols and the second set of modulated symbols further based on the first number of layers of the at least one first layer of the plurality of layers mapped to the first c-CW, the second number of layers of the at least one second layer of the plurality of layers mapped to the first p-CW, and the number of modulated symbols per layer of the plurality of layers. The apparatus 1504 may include means for calculating a second number of layers of the at least one second layer of the plurality of layers mapped to the first p-CW based on a third indication of a first number of layers of the at least one first layer of the plurality of layers mapped to the first c-CW and the total number of layers of the plurality of layers. The apparatus 1504 may include means for calculating the first number of layers of the at least one first layer of the plurality of layers mapped to the first c-CW based on a fourth indication of the second number of layers of the at least one second layer of the plurality of layers mapped to the first p-CW and the total number of layers of the plurality of layers. The apparatus 1504 may include means for calculating the second number of layers or calculating the first number of layers in response to the first indication indicating a presence of at least one c-CW. The apparatus 1504 may include means for calculating a second number of layers of the at least one second layer of the plurality of layers mapped to the first p-CW based on a first number of layers of the at least one first layer of the plurality of layers mapped to the first c-CW and the total number of layers of the plurality of layers. The apparatus 1504 may include means for identifying the first set of modulated symbols and the second set of modulated symbols further based on the number of modulated symbols per layer of the plurality of layers. The apparatus 1504 may include means for transmitting a capability indication of a first maximum number of layers for the first c-CW and a second maximum number of layers for the first p-CW. The apparatus 1504 may include means for transmitting feedback associated with at least one of CSI or an SRS. The mapping of the plurality of layers may be based on the transmitted feedback. The apparatus 1504 may include means for performing the decoding process by decoding at least one of the first c-CW or the first p-CW based on at least one of the first set of modulated symbols or the second set of modulated symbols. The apparatus 1504 may include means for calculating a first number of layers of the at least one first layer of the plurality of layers mapped to the first c-CW and a second number of layers of at least one third layer of the plurality of layers mapped to a second c-CW. The apparatus 1504 may include means for calculating a first number of layers of the at least one second layer of the plurality of layers mapped to the first p-CW and a second number of layers of at least one third layer of the plurality of layers mapped to a second p-CW. The apparatus 1504 may include means for transmitting a capability indication of a first maximum number of c-CWs or a maximum number of p-CWs. The means may be the component 198 of the apparatus 1504 configured to perform the functions recited by the means. As described supra, the apparatus 1504 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 16:
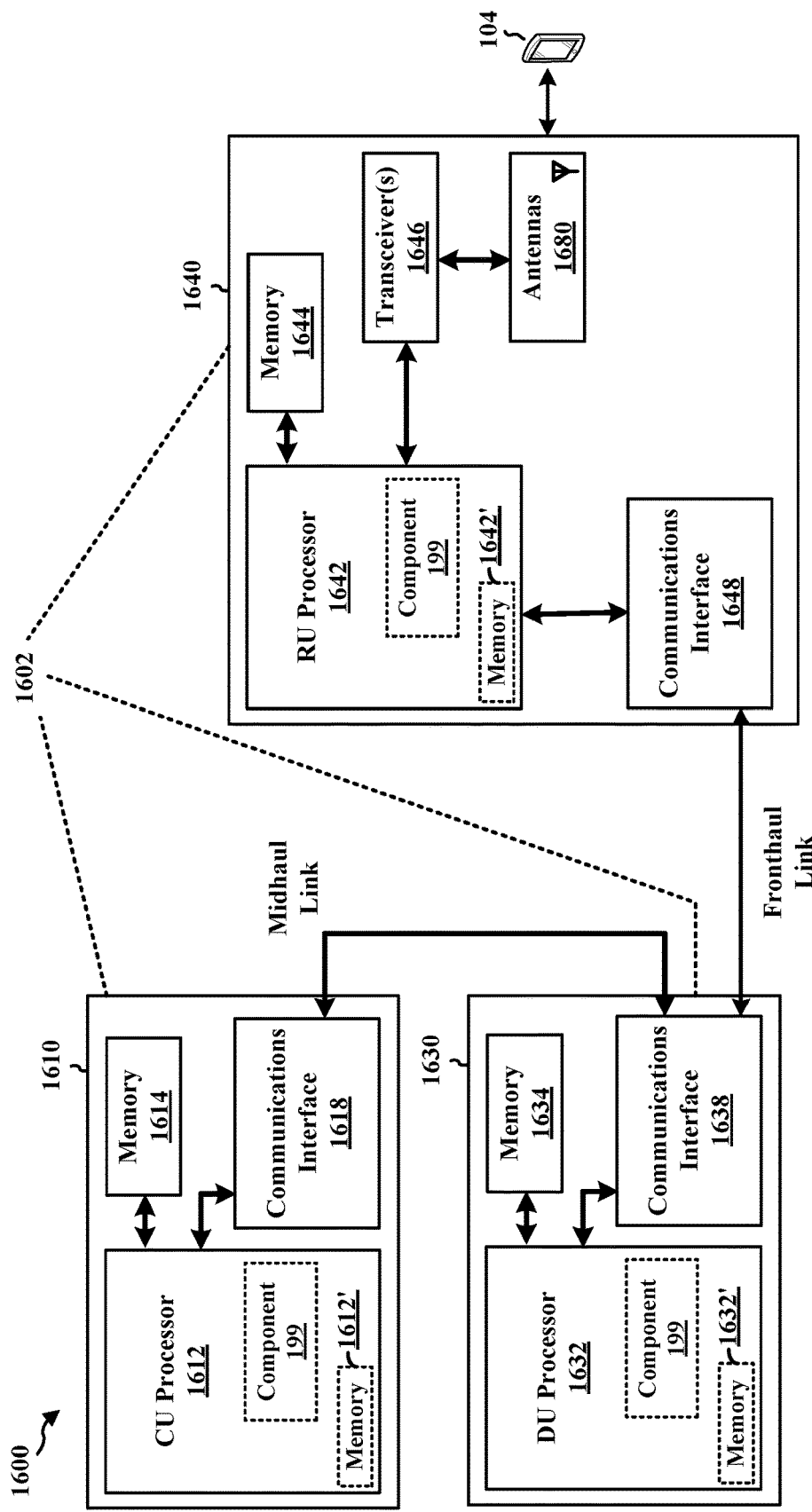
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to map a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. The component 199 may be configured to transmit a first indication of the mapping of the plurality of layers to the first c-CW and the first p-CW for a first UE. The first indication may indicate that the first c-CW corresponds to the at least one first layer and the first p-CW corresponds to the at least one second layer. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for mapping a plurality of layers to a first c-CW and a first p-CW. The network entity 1602 may include means for transmitting a first indication of the mapping of the plurality of layers to the first c-CW and the first p-CW for a first UE. The network entity 1602 may include means for transmitting the first indication of the mapping by transmitting first DCI having the first indication. The network entity 1602 may include means for transmitting second DCI having a MIMO communication without rate-splitting. The network entity 1602 may include means for receiving a capability indication of a first maximum number of layers for the first c-CW and a second maximum number of layers for the first p-CW. The network entity 1602 may include means for receiving feedback associated with at least one of CSI or an SRS from the first UE. The network entity 1602 may include means for mapping the plurality of layers by mapping the plurality of layers to a second p-CW. The network entity 1602 may include means for receiving a capability indication of a maximum number of c-CWs or a maximum number of p-CWs. The means may be the component 199 of the network entity 1602 configured to perform the functions recited by the means. As described supra, the network entity 1602 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." A "set" or a "subset" of elements includes one or more elements (i.e., at least one element or a plurality of elements). Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include receiving a first indication of a mapping of a plurality of layers to a first c-CW and a first p-CW from a network entity. The first indication may indicate that the first c-CW corresponds to at least one first layer of the plurality of layers and that the first p-CW corresponds to at least one second layer of the plurality of layers. The plurality of layers may be associated with MIMO communication. The first c-CW and the first p-CW may be associated with rate-splitting for the MIMO communication. The method may further include identifying a first set of modulated symbols of the first c-CW that is mapped to the at least one first layer and a second set of modulated symbols of the first p-CW that is mapped to the at least one second layer based on the first indication. The method may further include performing a decoding process for at least one of the first c-CW or the first p-CW based on at least one of the first set of modulated symbols or the second set of modulated symbols.

Aspect 2 is the method of aspect 1, where receiving the first indication may include receiving first DCI having the first indication.

Aspect 3 is the method of aspect 2, where the method may further include receiving second DCI scheduling a MIMO communication without rate-splitting. The second DCI may have a same size as the first DCI. The second DCI may include padding.

Aspect 4 is the method of any of aspects 1 to 3, where the first indication may include at least one of a second indication of a first number of layers of the at least one first layer of the plurality of layers mapped to the first c-CW or a third indication of a second number of layers of the at least one second layer of the plurality of layers mapped to the first p-CW.

Aspect 5 is the method of aspect 4, where a number of modulated symbols per layer of the plurality of layers may be fixed. The at least one first layer of the plurality of layers mapped to the first c-CW may be consecutive. The at least one second layer of the plurality of layers mapped to the first p-CW may be consecutive. Identifying the first set of modulated symbols and the second set of modulated symbols may be further based on the first number of layers of the at least one first layer of the plurality of layers mapped to the first c-CW, the second number of layers of the at least one second layer of the plurality of layers mapped to the first p-CW, and the number of modulated symbols per layer of the plurality of layers.

Aspect 6 is the method of any of aspects 1 to 5, where the first indication may include a second indication of a set of DMRS ports associated with the first c-CW or the first p-CW.

Aspect 7 is the method of any of aspects 1 to 6, where the first indication may include a second indication of a total number of layers of the plurality of layers.

Aspect 8 is the method of aspect 7, where the method may further include calculating a second number of layers of the at least one second layer of the plurality of layers mapped to the first p-CW based on a third indication of a first number of layers of the at least one first layer of the plurality of layers mapped to the first c-CW and the total number of layers of the plurality of layers. The first indication may include the third indication. The method may alternatively or additionally include calculating the first number of layers of the at least one first layer of the plurality of layers mapped to the first c-CW based on a fourth indication of the second number of layers of the at least one second layer of the plurality of layers mapped to the first p-CW and the total number of layers of the plurality of layers. The first indication may include the fourth indication Aspect 9 is the method of aspect 8, where calculating the second number of layers or calculating the first number of layers may be in response to the first indication indicating a presence of at least one c-CW.

Aspect 10 is the method of any of aspects 1 to 9, where the method may further include calculating a second number of layers of the at least one second layer of the plurality of layers mapped to the first p-CW based on a first number of layers of the at least one first layer of the plurality of layers mapped to the first c-CW and the total number of layers of the plurality of layers. The first number of layers of the at least one first layer of the plurality of layers may be fixed.

Aspect 11 is the method of any of aspects 1 to 10, where the first indication may include a second number of layers of the at least one second layer of the plurality of layers mapped to the first p-CW. A first number of layers of the at least one first layer of the plurality of layers mapped to the first c-CW may be fixed.

Aspect 12 is the method of any of aspects 1 to 11, where a number of modulated symbols per layer of the plurality of layers may be fixed. Identifying the first set of modulated symbols and the second set of modulated symbols may be further based on the number of modulated symbols per layer of the plurality of layers.

Aspect 13 is the method of any of aspects 1 to 12, where the method may further include transmitting a capability indication of a first maximum number of layers for the first c-CW and a second maximum number of layers for the first p-CW. The mapping of the plurality of layers may be based on the capability indication.

Aspect 14 is the method of any of aspects 1 to 13, where the method may further include transmitting feedback associated with at least one of CSI or an SRS. The mapping of the plurality of layers may be based on the transmitted feedback.

Aspect 15 is the method of any of aspects 1 to 14, where the first c-CW may be associated with a first decoding process for a plurality of UEs. The first p-CW may be associated with a second decoding process for the first UE.

Aspect 16 is the method of any of aspects 1 to 15, where performing the decoding process may include decoding at least one of the first c-CW or the first p-CW based on at least one of the first set of modulated symbols or the second set of modulated symbols.

Aspect 17 is the method of any of aspects 1 to 16, where the first indication may further include at least one of (1) a second indication of a first number of layers of the at least one first layer of the plurality of layers mapped to the first c-CW or (2) a third indication of a second number of layers of at least one third layer of the plurality of layers mapped to a second c-CW.

Aspect 18 is the method of any of aspects 1 to 17, where the method may further include calculating a first number of layers of the at least one first layer of the plurality of layers mapped to the first c-CW and a second number of layers of at least one third layer of the plurality of layers mapped to a second c-CW. The first indication may include a total number of layers of the plurality of layers associated with at least one of the first c-CW and the second c-CW.

Aspect 19 is the method of any of aspects 1 to 18, where the first indication may further include at least one of a second indication of a first number of layers of the at least one second layer of the plurality of layers mapped to the first p-CW or a third indication of a second number of layers of at least one third layer of the plurality of layers mapped to a second p-CW.

Aspect 20 is the method of any of aspects 1 to 19, where the method may further include calculating a first number of layers of the at least one second layer of the plurality of layers mapped to the first p-CW and a second number of layers of at least one third layer of the plurality of layers mapped to a second p-CW. The first indication may include a total number of layers of the plurality of layers associated with at least one of the first p-CW and the second p-CW.

Aspect 21 is the method of any of aspects 1 to 20, where the method may further include transmitting a capability indication of a first maximum number of c-CWs or a maximum number of p-CWs. The mapping of the plurality of layers may be further based on the capability indication.

Aspect 22 is a method of wireless communication at a network entity, where the method may include mapping a plurality of layers to a first c-CW and a first p-CW. A first set of modulated symbols of the first c-CW may be mapped to at least one first layer of the plurality of layers. A second set of modulated symbols of the first p-CW may be mapped to at least one second layer of the plurality of layers. The plurality of layers may be associated with MIMO communication. The first c-CW and the first p-CW may be associated with rate-splitting for the MIMO communication. The method may further include transmitting a first indication of the mapping of the plurality of layers to the first c-CW and the first p-CW for a first UE. The first indication may indicate that the first c-CW corresponds to the at least one first layer and the first p-CW corresponds to the at least one second layer.

Aspect 23 is the method of aspect 22, where transmitting the first indication of the mapping may include transmitting first DCI having the first indication.

Aspect 24 is the method of any of aspects 22 to 23, where the method may further include transmitting second DCI scheduling a MIMO communication without rate-splitting. The second DCI may have a same size as the first DCI. The second DCI may include padding.

Aspect 25 is the method of aspect 24, where the first indication includes at least one of a second indication of a first number of layers of the at least one first layer of the plurality of layers mapped to the first c-CW or a third indication of a second number of layers of the at least one second layer of the plurality of layers mapped to the first p-CW.

Aspect 26 is the method of any of aspects 22 to 25, where the first indication may include at least one of a second indication of a first number of layers of the at least one first layer of the plurality of layers mapped to the first c-CW or a third indication of a second number of layers of the at least one second layer of the plurality of layers mapped to the first p-CW.

Aspect 27 is the method of any of aspects 22 to 26, where the first indication may include a second indication of a set of DMRS ports associated with the first c-CW or the first p-CW.

Aspect 28 is the method of any of aspects 22 to 27, where the first indication may include a second indication of a total number of layers of the plurality of layers.

Aspect 29 is the method of any of aspects 22 to 28, where the first indication may include one of a third indication of a first number of layers of the at least one first layer of the plurality of layers mapped to the first c-CW or a fourth indication of a second number of layers of the at least one second layer of the plurality of layers mapped to the first p-CW.

Aspect 30 is the method of any of aspects 22 to 29, where a first number of layers of the at least one first layer of the plurality of layers mapped to the first c-CW may be fixed.

Aspect 31 is the method of aspect 30, where the first indication may include a second indication of a second number of layers of the at least one second layer of the plurality of layers mapped to the first p-CW.

Aspect 32 is the method of any of aspects 30 to 31, where the first indication may include a second indication of a total number of layers of the plurality of layers.

Aspect 33 is the method of any of aspects 30 to 32, where the first indication may include a second indication of a number of c-CWs scheduled for the MIMO communication associated with rate-splitting.

Aspect 34 is the method of any of aspects 22 to 33, where a number of modulated symbols per layer of the plurality of layers may be fixed.

Aspect 35 is the method of any of aspects 22 to 34, where the at least one first layer of the plurality of layers mapped to the first c-CW may be consecutive. The at least one second layer of the plurality of layers mapped to the first p-CW may be consecutive.

Aspect 36 is the method of any of aspects 22 to 35, where the method may further include receiving a capability indication of a first maximum number of layers for the first c-CW and a second maximum number of layers for the first p-CW. The mapping of the plurality of layers may be based on the capability indication.

Aspect 37 is the method of aspect 36, where a sum of the first maximum number of layers and the second maximum number of layers may not equal a third maximum number of layers for a MIMO communication without rate-splitting.

Aspect 38 is the method of any of aspects 36 to 37, where an RI of the first c-CW may not exceed the first maximum number of layers for the first c-CW.

Aspect 39 is the method of any of aspects 22 to 38, where the method may further include receiving feedback associated with at least one of CSI or an SRS from the first UE. The mapping of the plurality of layers may be based on the received feedback.

Aspect 40 is the method of any of aspects 22 to 39, where the first c-CW may be associated with a first decoding process for a plurality of UEs. The first p-CW may be associated with a second decoding process for a first UE.

Aspect 41 is the method of any of aspects 22 to 40, where the first indication may further include at least one of a second indication of a first number of layers of the at least one first layer of the plurality of layers mapped to the first c-CW or a third indication of a second number of layers of at least one third layer of the plurality of layers mapped to a second c-CW.

Aspect 42 is the method of any of aspects 22 to 41, where mapping the plurality of layers may include mapping the plurality of layers to a second p-CW. A third set of modulated symbols of the second p-CW may be mapped to at least one third layer of the plurality of layers.

Aspect 43 is the method of aspect 42, where the at least one first layer of the plurality of layers mapped to the first p-CW may be consecutive The at least one third layer of the plurality of layers mapped to the second p-CW may be consecutive.

Aspect 44 is the method of any of aspects 22 to 43, where the method may further include receiving a capability indication of a maximum number of c-CWs or a maximum number of p-CWs. The mapping of the plurality of layers may be based on the capability indication.

What is claimed is:

1. An apparatus for wireless communication at a user equipment (UE), comprising:
 a memory; and
 at least one processor coupled to the memory and, based at least in part on information stored in the memory, the at least one processor is configured to:
  receive a first indication of a mapping of a plurality of layers to a first common codeword (c-CW) and a first private codeword (p-CW) from a network entity, wherein the first indication indicates the first c-CW corresponds to at least one first layer of the plurality of layers and the first p-CW corresponds to at least one second layer of the plurality of layers, wherein the plurality of layers is associated with multiple input-multiple output (MIMO) communication, wherein the first c-CW and the first p-CW are associated with rate-splitting for the MIMO communication;
  identify a first set of modulated symbols of the first c-CW that is mapped to the at least one first layer and a second set of modulated symbols of the first p-CW that is mapped to the at least one second layer based on the first indication; and
  perform a decoding process for at least one of the first c-CW or the first p-CW based on at least one of the first set of modulated symbols or the second set of modulated symbols.

2. The apparatus of claim 1, further comprising a transceiver coupled to the at least one processor, wherein to receive the first indication the at least one processor is configured to receive first downlink control information (DCI) comprising the first indication, wherein the at least one processor is configured to:
 receive, via the transceiver, second DCI scheduling a MIMO communication without rate-splitting, wherein the second DCI has a same size as the first DCI, wherein the second DCI includes padding.

3. The apparatus of claim 1, wherein the first indication comprises at least one of a second indication of a first number of layers of the at least one first layer of the plurality of layers mapped to the first c-CW, a third indication of a second number of layers of the at least one second layer of the plurality of layers mapped to the first p-CW, or a fourth indication of a set of demodulation reference signal (DMRS) ports associated with the first c-CW or the first p-CW.

4. The apparatus of claim 3, wherein a number of modulated symbols per layer of the plurality of layers is fixed, wherein the at least one first layer of the plurality of layers mapped to the first c-CW is consecutive and the at least one second layer of the plurality of layers mapped to the first p-CW is consecutive, wherein the at least one processor is further configured to identify the first set of modulated symbols and the second set of modulated symbols further based on the first number of layers of the at least one first layer of the plurality of layers mapped to the first c-CW, the second number of layers of the at least one second layer of the plurality of layers mapped to the first p-CW, and the number of modulated symbols per layer of the plurality of layers.

5. The apparatus of claim 1, wherein the first indication comprises a second indication of a total number of layers of the plurality of layers, wherein calculating the second number of layers or calculating the first number of layers is in response to the first indication indicating a presence of at least one c-CW, wherein the at least one processor is further configured to:

calculate a second number of layers of the at least one second layer of the plurality of layers mapped to the first p-CW based on a third indication of a first number of layers of the at least one first layer of the plurality of layers mapped to the first c-CW and the total number of layers of the plurality of layers, wherein the first indication comprises the third indication; or calculate the first number of layers of the at least one first layer of the plurality of layers mapped to the first c-CW based on a fourth indication of the second number of layers of the at least one second layer of the plurality of layers mapped to the first p-CW and the total number of layers of the plurality of layers, wherein the first indication comprises the fourth indication.

6. The apparatus of claim 1, wherein the first indication comprises a second indication of a total number of layers of the plurality of layers, wherein the at least one processor is further configured to:

calculate a second number of layers of the at least one second layer of the plurality of layers mapped to the first p-CW based on a first number of layers of the at least one first layer of the plurality of layers mapped to the first c-CW and the total number of layers of the plurality of layers, wherein the first number of layers of the at least one first layer of the plurality of layers is fixed.

7. The apparatus of claim 1, wherein the first indication comprises a second number of layers of the at least one second layer of the plurality of layers mapped to the first p-CW, wherein a first number of layers of the at least one first layer of the plurality of layers mapped to the first c-CW is fixed.

8. The apparatus of claim 1, wherein a number of modulated symbols per layer of the plurality of layers is fixed, wherein the at least one processor is further configured to identify the first set of modulated symbols and the second set of modulated symbols further based on the number of modulated symbols per layer of the plurality of layers.

9. The apparatus of claim 1, wherein the at least one processor is further configured to:

transmit a capability indication of a first maximum number of layers for the first c-CW and a second maximum number of layers for the first p-CW, wherein the mapping of the plurality of layers is further based on the capability indication.

10. The apparatus of claim 1, wherein the first c-CW is associated with a first decoding process for a plurality of UEs and the first p-CW is associated with a second decoding process for the first UE, wherein the at least one processor is further configured to perform the decoding process by decoding at least one of the first c-CW or the first p-CW based on at least one of the first set of modulated symbols or the second set of modulated symbols.

11. The apparatus of claim 1, wherein the first indication further comprises at least one of a second indication of a first number of layers of the at least one first layer of the plurality of layers mapped to the first c-CW or a third indication of a second number of layers of at least one third layer of the plurality of layers mapped to a second c-CW.

12. The apparatus of claim 1, wherein the at least one processor is further configured to:

calculate a first number of layers of the at least one first layer of the plurality of layers mapped to the first c-CW and a second number of layers of at least one third layer of the plurality of layers mapped to a second c-CW, wherein the first indication comprises a total number of layers of the plurality of layers associated with at least one of the first c-CW and the second c-CW.

13. The apparatus of claim 1, wherein the first indication further comprises at least one of a second indication of a first number of layers of the at least one second layer of the plurality of layers mapped to the first p-CW or a third indication of a second number of layers of at least one third layer of the plurality of layers mapped to a second p-CW.

14. The apparatus of claim 1, wherein the at least one processor is further configured to:

calculate a first number of layers of the at least one second layer of the plurality of layers mapped to the first p-CW and a second number of layers of at least one third layer of the plurality of layers mapped to a second p-CW, wherein the first indication comprises a total number of layers of the plurality of layers associated with at least one of the first p-CW and the second p-CW.

15. The apparatus of claim 1, wherein the at least one processor is further configured to:

transmit feedback associated with at least one of channel state information (CSI) or a sounding reference symbols (SRS), wherein the mapping of the plurality of layers is further based on the transmitted feedback.

16. An apparatus for wireless communication at a network entity, comprising:

a memory; and at least one processor coupled to the memory and, based at least in part on information stored in the memory, the at least one processor is configured to:

map a plurality of layers to a first common codeword (c-CW) and a first private codeword (p-CW), wherein a first set of modulated symbols of the first c-CW is mapped to at least one first layer of the plurality of layers and a second set of modulated symbols of the first p-CW is mapped to at least one second layer of the plurality of layers, wherein the plurality of layers is associated with multiple input-multiple output (MIMO) communication, wherein the first c-CW and the first p-CW are associated with rate-splitting for the MIMO communication; and transmit a first indication of the mapping of the plurality of layers to the first c-CW and the first p-CW for a first user equipment (UE), wherein the first indication indicates that the first c-CW corresponds to the at least one first layer and the first p-CW corresponds to the at least one second layer.

17. The apparatus of claim 16, further comprising a transceiver coupled to the at least one processor, wherein to transmit the first indication of the mapping the at least one processor is configured to transmit first downlink control information (DCI) comprising the first indication, wherein the at least one processor is further configured to:

transmit second DCI scheduling a MIMO communication without rate-splitting, wherein the second DCI has a same size as the first DCI, wherein the second DCI includes padding.

18. The apparatus of claim 16, wherein the first indication comprises at least one of a second indication of a first number of layers of the at least one first layer of the plurality of layers mapped to the first c-CW or a third indication of a second number of layers of the at least one second layer of the plurality of layers mapped to the first p-CW, wherein the first indication comprises a fourth indication of a set of demodulation reference signal (DMRS) ports associated with the first c-CW or the first p-CW.

19. The apparatus of claim 16, wherein the first indication comprises a second indication of a total number of layers of the plurality of layers, wherein the first indication comprises one of a third indication of a first number of layers of the at least one first layer of the plurality of layers mapped to the first c-CW or a fourth indication of a second number of layers of the at least one second layer of the plurality of layers mapped to the first p-CW.

20. The apparatus of claim 16, wherein a first number of layers of the at least one first layer of the plurality of layers mapped to the first c-CW is fixed, wherein the first indication comprises a second indication of a second number of layers of the at least one second layer of the plurality of layers mapped to the first p-CW, wherein the first indication comprises a third indication of a total number of layers of the plurality of layers.

21. The apparatus of claim 16, wherein a first number of layers of the at least one first layer of the plurality of layers mapped to the first c-CW is fixed, wherein the first indication comprises a second indication of a number of c-CWs scheduled for the MIMO communication associated with rate-splitting.

22. The apparatus of claim 16, wherein a number of modulated symbols per layer of the plurality of layers is fixed, wherein the at least one first layer of the plurality of layers mapped to the first c-CW is consecutive and the at least one second layer of the plurality of layers mapped to the first p-CW is consecutive.

23. The apparatus of claim 16, wherein the at least one processor is further configured to:
receive a capability indication of a first maximum number of layers for the first c-CW and a second maximum number of layers for the first p-CW, wherein the mapping of the plurality of layers is further based on the capability indication, wherein a rank indicator (RI) of the first c-CW does not exceed the first maximum number of layers for the first c-CW.

24. The apparatus of claim 16, wherein the at least one processor is further configured to:
receive feedback associated with at least one of channel state information (CSI) or a sounding reference symbol (SRS) from the first UE, wherein the mapping of the plurality of layers is further based on the received feedback.

25. The apparatus of claim 16, wherein the first c-CW is associated with a first decoding process for a plurality of UEs and the first p-CW is associated with a second decoding process for a first UE.

26. The apparatus of claim 16, wherein the first indication further comprises at least one of a second indication of a first number of layers of the at least one first layer of the plurality of layers mapped to the first c-CW or a third indication of a second number of layers of at least one third layer of the plurality of layers mapped to a second c-CW.

27. The apparatus of claim 16, wherein mapping the plurality of layers comprises mapping the plurality of layers to a second p-CW, wherein a third set of modulated symbols of the second p-CW is mapped to at least one third layer of the plurality of layers, wherein the at least one first layer of the plurality of layers mapped to the first p-CW is consecutive, wherein the at least one third layer of the plurality of layers mapped to the second p-CW is consecutive.

28. The apparatus of claim 16, wherein the at least one processor is further configured to:
receive a capability indication of a maximum number of c-CWs or a maximum number of p-CWs, wherein the mapping of the plurality of layers is further based on the capability indication.

29. A method of wireless communication at a user equipment (UE), comprising:
receiving a first indication of a mapping of a plurality of layers to a first common codeword (c-CW) and a first private codeword (p-CW) from a network entity, wherein the first indication indicates the first c-CW corresponds to at least one first layer of the plurality of layers and the first p-CW corresponds to at least one second layer of the plurality of layers, wherein the plurality of layers is associated with multiple input-multiple output (MIMO) communication, wherein the first c-CW and the first p-CW are associated with rate-splitting for the MIMO communication;
identifying a first set of modulated symbols of the first c-CW that is mapped to the at least one first layer and a second set of modulated symbols of the first p-CW that is mapped to the at least one second layer based on the first indication; and
performing a decoding process for at least one of the first c-CW or the first p-CW based on at least one of the first set of modulated symbols or the second set of modulated symbols.

30. A method of wireless communication at a network entity, comprising:
mapping a plurality of layers to a first common codeword (c-CW) and a first private codeword (p-CW), wherein a first set of modulated symbols of the first c-CW is mapped to at least one first layer of the plurality of layers and a second set of modulated symbols of the first p-CW is mapped to at least one second layer of the plurality of layers, wherein the plurality of layers is associated with multiple input-multiple output (MIMO) communication, wherein the first c-CW and the first p-CW are associated with rate-splitting for the MIMO communication; and
transmitting a first indication of the mapping of the plurality of layers to the first c-CW and the first p-CW for a first user equipment (UE), wherein the first indication indicates that the first c-CW corresponds to the at least one first layer and the first p-CW corresponds to the at least one second layer.

* * * * *